United States Patent [19] | [11] 4,054,756

Comella et al. | [45] Oct. 18, 1977

[54] METHOD AND APPARATUS FOR AUTOMATING SPECIAL SERVICE CALL HANDLING

[75] Inventors: William Kirk Comella, Naperville, Ill.; Bernard Julius Yokelson, Mendham Township, Morris County, N.J.

[73] Assignee: Bell Telephone Laboratories, Incorporated, Murray Hill, N.J.

[21] Appl. No.: 727,767

[22] Filed: Sept. 29, 1976

[51] Int. Cl.[2] ...................... H04M 3/42; H04M 17/00

[52] U.S. Cl. ................................ 179/18 B; 179/6.3 R

[58] Field of Search ............... 179/18 B, 27 FF, 7.1 R

[56] References Cited

U.S. PATENT DOCUMENTS

| | | | |
|---|---|---|---|
| 2,676,209 | 4/1954 | Joel | 179/6.31 |
| 2,761,900 | 9/1956 | Joel | 179/6.3 R |
| 3,175,039 | 3/1965 | Wilbourn | 179/7.1 TP |
| 3,394,229 | 7/1968 | Miller et al. | 179/7.1 R |
| 3,453,389 | 7/1969 | Shaer | 179/7.1 R |

*Primary Examiner*—William C. Cooper
*Attorney, Agent, or Firm*—Martin S. Landis; John C. Albrecht

[57] ABSTRACT

A system is disclosed for serving special service calls such as collect, person-to-person and charge-to-third number on a wholly automatic basis without any operator intervention normally being required. The system requests specific information from the calling party such as, his or her name for collect calls, and utilizes the received answers in the formulation of additional announcements to the "called" subscriber. The system is responsive to information received from the called station or third party station for instituting billing for the requested call after a connection is established between the calling and called stations.

19 Claims, 24 Drawing Figures

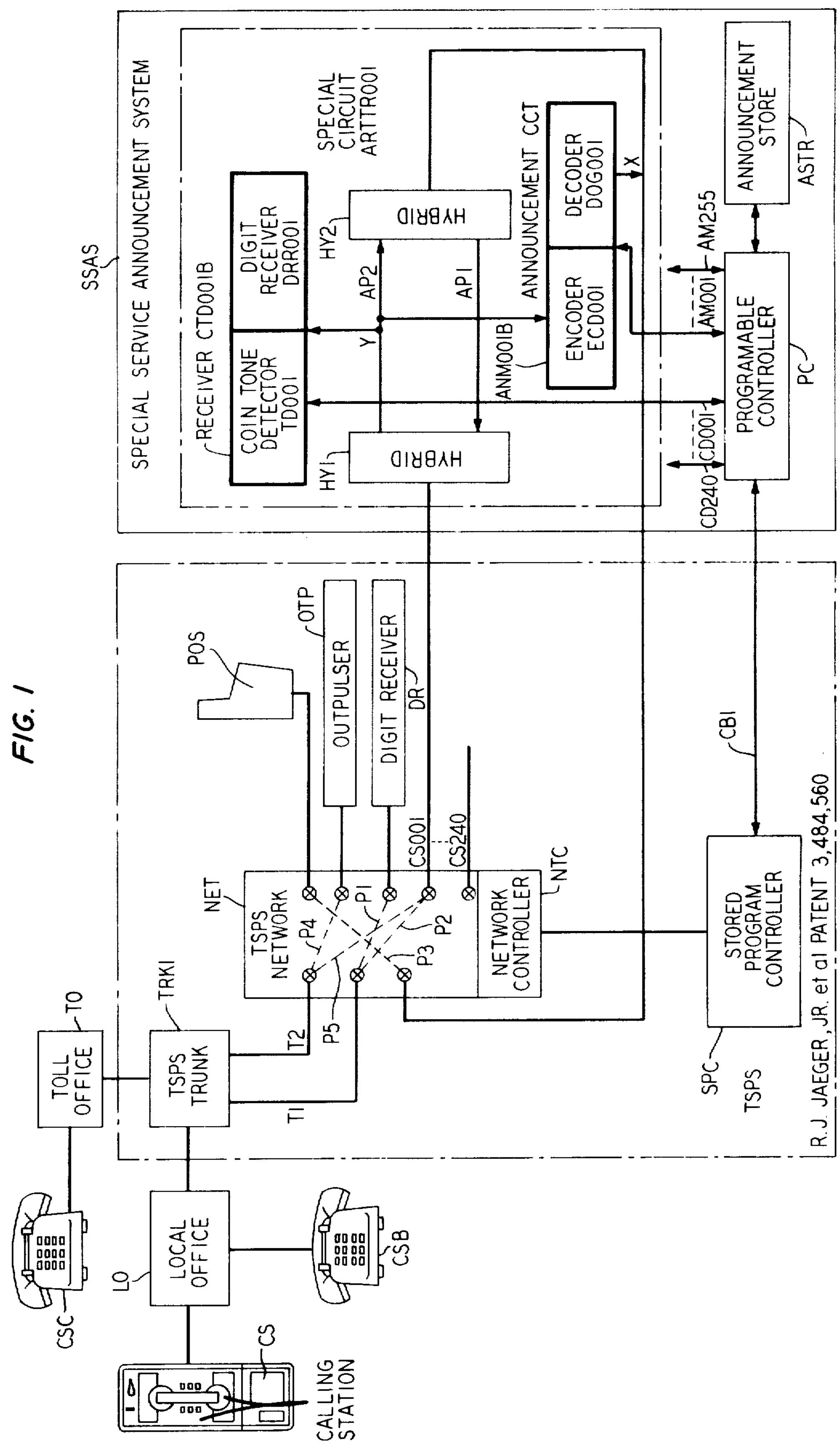

FIG. 1
SSAS
SPECIAL SERVICE ANNOUNCEMENT SYSTEM
RECEIVER CTD001B
COIN TONE DETECTOR TD001
DIGIT RECEIVER DRR001
SPECIAL CIRCUIT ARTTR001
HYBRID
HY1
HY2
AP1
AP2
Y
X
ANNOUNCEMENT CCT
ANM001B
ENCODER ECD001
DECODER DOG001
AM001
AM255
CD001
CD240
PROGRAMABLE CONTROLLER
PC
ANNOUNCEMENT STORE
ASTR
POS
OTP
OUTPULSER
DIGIT RECEIVER
DR
CS001
CS240
CB1
NET
TSPS NETWORK
P1
P2
P3
P4
P5
NETWORK CONTROLLER
NTC
STORED PROGRAM CONTROLLER
SPC
TSPS
R.J. JAEGER, JR. et al PATENT 3,484,560
TO
TOLL OFFICE
TRK1
TSPS TRUNK
T1
T2
LO
LOCAL OFFICE
CSC
CSB
CS
CALLING STATION

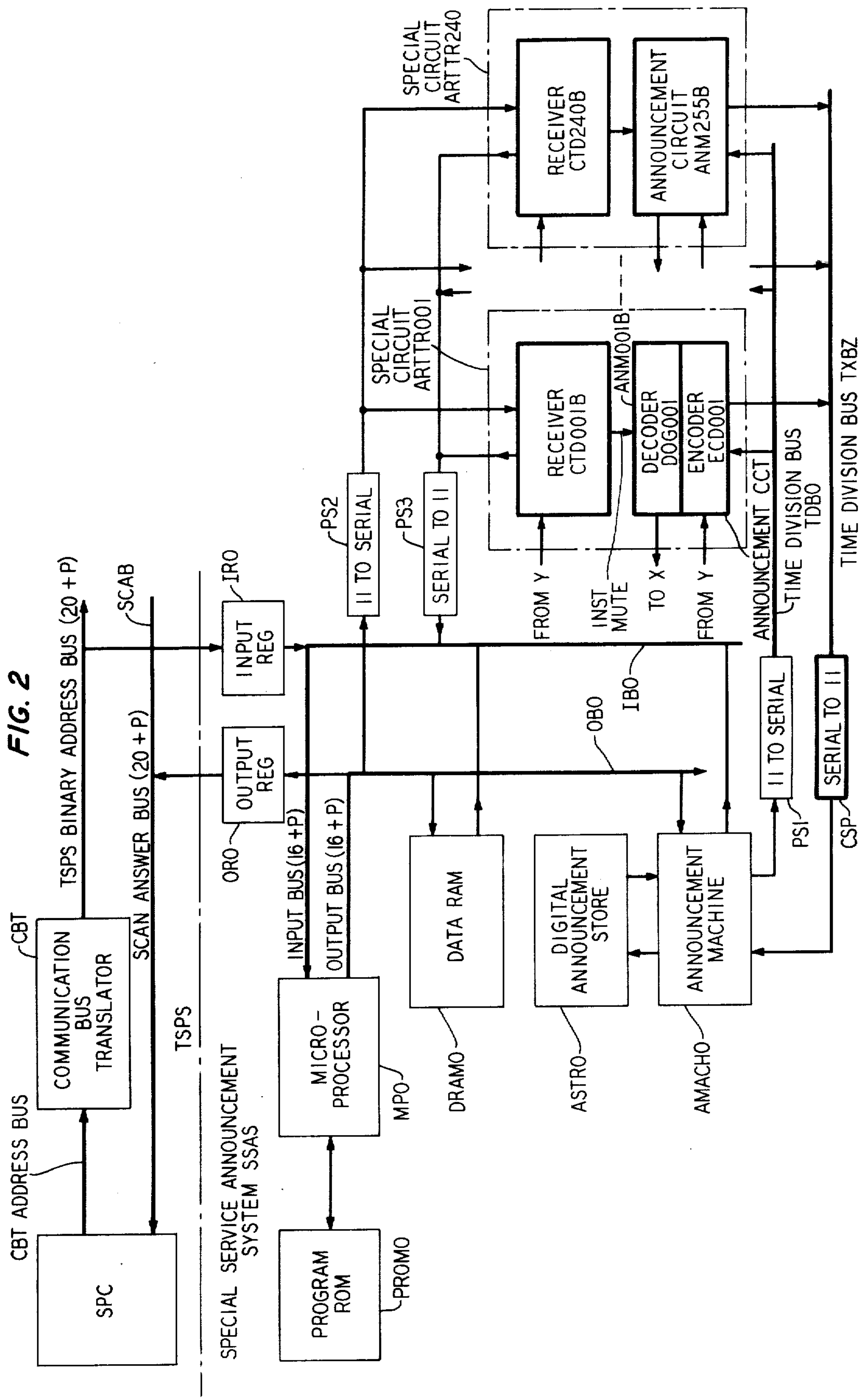
FIG. 2
SPC
CBT ADDRESS BUS
COMMUNICATION BUS TRANSLATOR
CBT
TSPS BINARY ADDRESS BUS (20 + P)
SCAN ANSWER BUS (20 + P)
SCAB
TSPS
SPECIAL SERVICE ANNOUNCEMENT SYSTEM SSAS
PROGRAM ROM
PROMO
MICRO-PROCESSOR
MPO
INPUT BUS (16 + P)
OUTPUT BUS (16 + P)
OUTPUT REG
ORO
INPUT REG
IRO
DATA RAM
DRAMO
DIGITAL ANNOUNCEMENT STORE
ASTRO
ANNOUNCEMENT MACHINE
AMACHO
OBO
IBO
11 TO SERIAL
PS1
SERIAL TO 11
CSP
11 TO SERIAL
PS2
SERIAL TO 11
PS3
FROM Y
INST MUTE
TO X
FROM Y
ANNOUNCEMENT CCT
TIME DIVISION BUS TDBO
TIME DIVISION BUS TXBZ
SPECIAL CIRCUIT ARTTR001
RECEIVER CTD001B
ANM001B
DECODER DOG001
ENCODER ECD001
SPECIAL CIRCUIT ARTTR240
RECEIVER CTD240B
ANNOUNCEMENT CIRCUIT ANM255B TSPS BINARY ADDRESS BUS
SCAN ANSWER BUS
TSPS
SPECIAL SERVICE ANNOUNCEMENT SYSTEM
SSAS
IRI
INPUT REG
ORI
OUTPUT REG
INPUT BUS
OUTPUT BUS
MICRO-PROCESSOR
MPI
PROM I
DATA RAM
DRAM I
DIGITAL ANNOUNCEMENT STORE
ASTRI
ANNOUNCEMENT MACHINE
AMACHI
II TO SERIAL
SERIAL TO II
OBI
IBI
TDBI

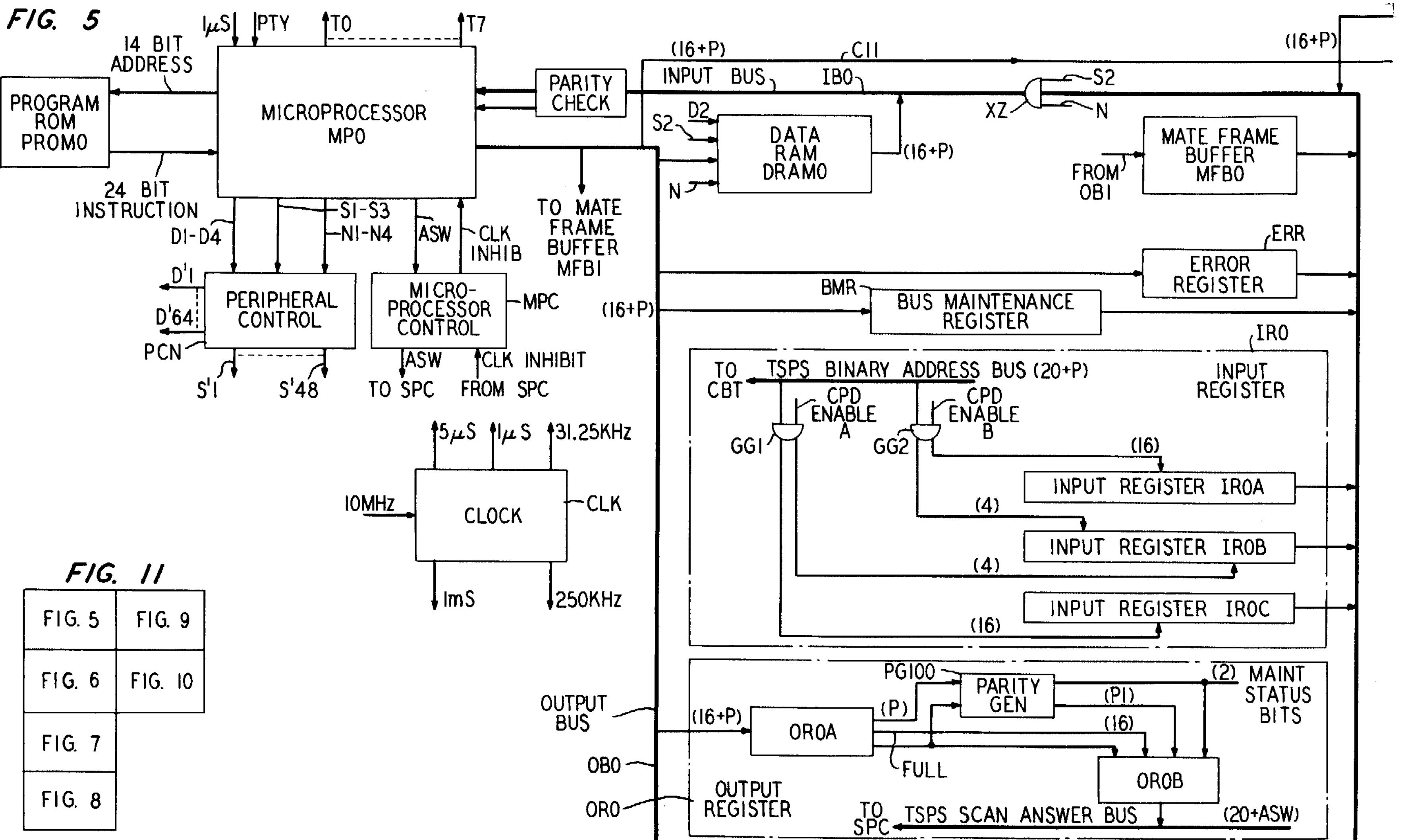
FIG. 5
1μS
PTY
TO
T7
14 BIT ADDRESS
PROGRAM ROM PROMO
MICROPROCESSOR MPO
24 BIT INSTRUCTION
DI-D4
SI-S3
NI-N4
ASW
CLK INHIB
PARITY CHECK
TO MATE FRAME BUFFER MFBI
D'1
D'64
PCN
PERIPHERAL CONTROL
S'1
S'48
MICRO-PROCESSOR CONTROL
MPC
ASW TO SPC
CLK INHIBIT FROM SPC
5μS
1μS
31.25KHz
10MHz
CLOCK
CLK
1mS
250KHz
(16+P)
C11
INPUT BUS
IBO
S2
D2
N
DATA RAM DRAMO
XZ
MATE FRAME BUFFER MFBO
FROM OBI
ERR
ERROR REGISTER
BMR
BUS MAINTENANCE REGISTER
IRO
TO CBT
TSPS BINARY ADDRESS BUS (20+P)
CPD ENABLE A
CPD ENABLE B
INPUT REGISTER
GG1
GG2
(16)
(4)
INPUT REGISTER IROA
INPUT REGISTER IROB
INPUT REGISTER IROC
OUTPUT BUS
OBO
ORO
PG100
PARITY GEN
(P)
(PI)
(2) MAINT STATUS BITS
OROA
FULL
OROB
OUTPUT REGISTER
TO SPC
TSPS SCAN ANSWER BUS
(20+ASW)
FIG. 11
FIG. 5
FIG. 9
FIG. 6
FIG. 10
FIG. 7
FIG. 8

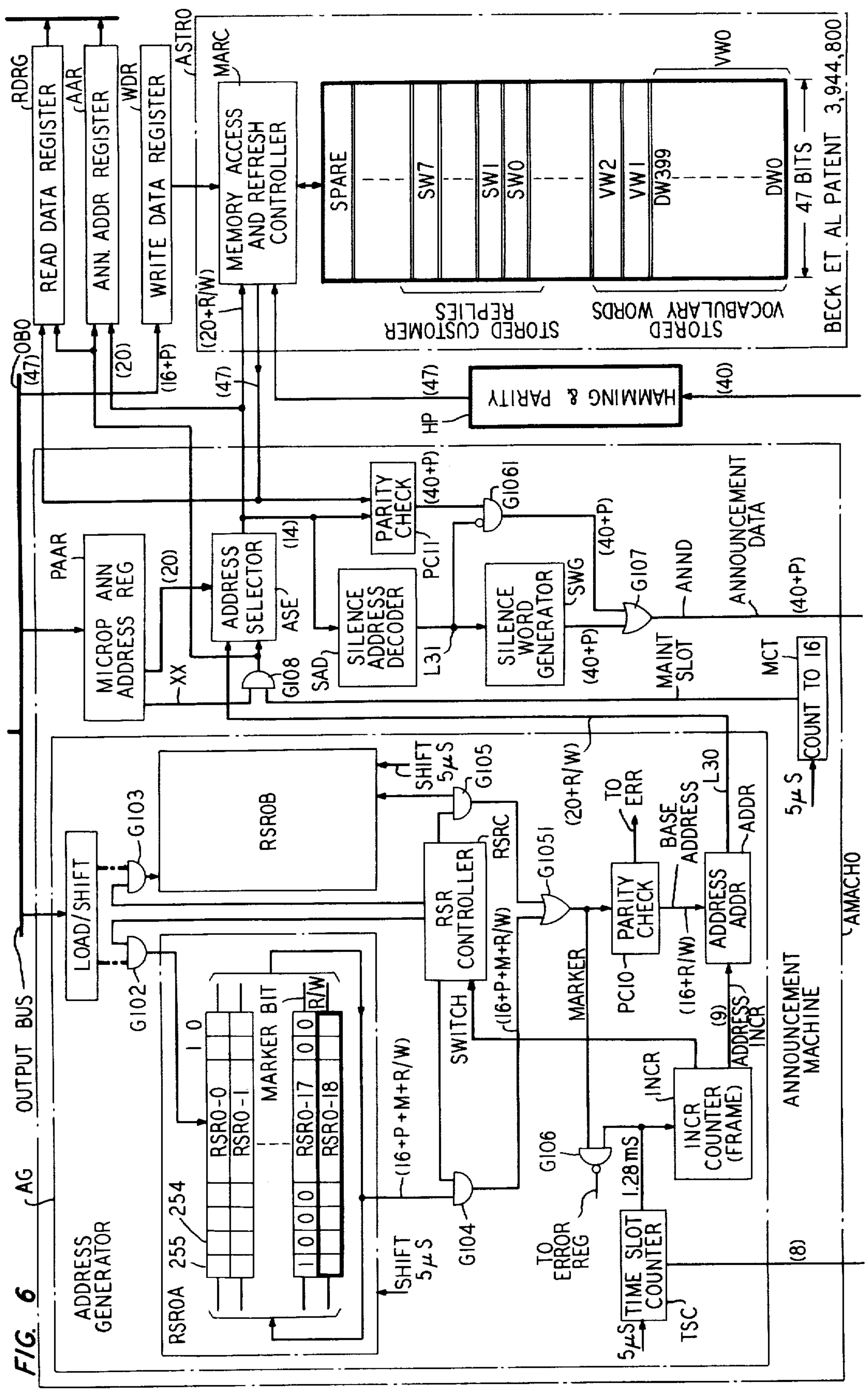
FIG. 6
READ DATA REGISTER
ANN. ADDR REGISTER
WRITE DATA REGISTER
MEMORY ACCESS AND REFRESH CONTROLLER
SPARE
SW7
SW1
SW0
VW2
VW1
DW399
DW0
47 BITS
STORED CUSTOMER REPLIES
STORED VOCABULARY WORDS
BECK ET AL PATENT 3,944,800
HAMMING & PARITY
PARITY CHECK
ADDRESS SELECTOR
SILENCE ADDRESS DECODER
SILENCE WORD GENERATOR
MICROP ANN ADDRESS REG
ANNOUNCEMENT DATA
COUNT TO 16
LOAD/SHIFT
RSROB
RSR CONTROLLER
PARITY CHECK
ADDRESS ADDR
INCR COUNTER (FRAME)
TIME SLOT COUNTER
ADDRESS GENERATOR
ANNOUNCEMENT MACHINE
OUTPUT BUS
MARKER BIT
TO ERROR REG
TO ERR
BASE ADDRESS

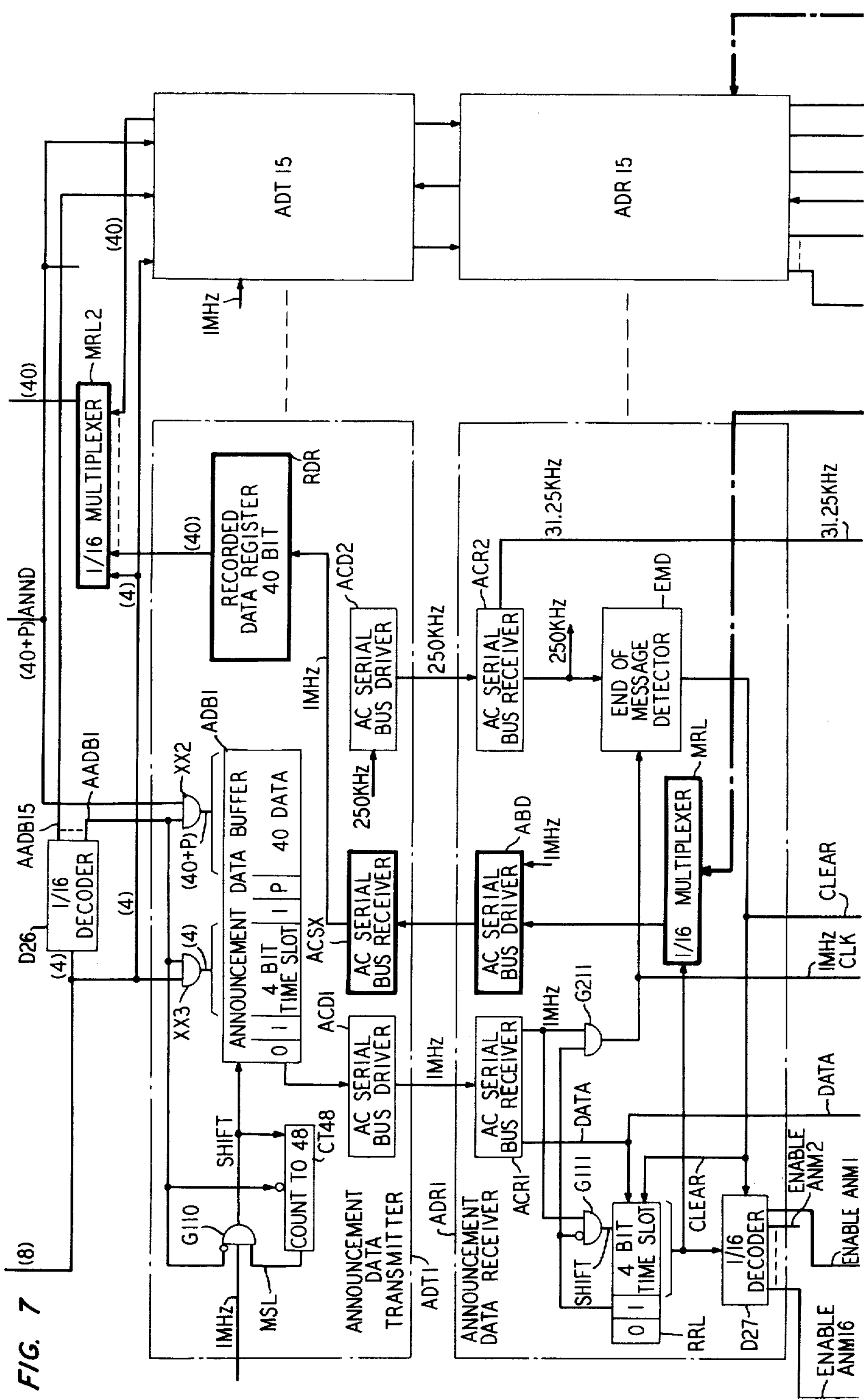
FIG. 7
ADT 15
ADR 15
1/16 MULTIPLEXER
MRL2
RECORDED DATA REGISTER 40 BIT
RDR
1/16 DECODER
D26
AADBI5
AADBI
XX2
XX3
ADBI
ANNOUNCEMENT DATA BUFFER
4 BIT TIME SLOT
40 DATA
COUNT TO 48
CT48
G110
SHIFT
1MHz
MSL
AC SERIAL BUS DRIVER
AC SERIAL BUS RECEIVER
ACD1
ACD2
ACSX
250KHz
ANNOUNCEMENT DATA TRANSMITTER
ADT1
ANNOUNCEMENT DATA RECEIVER
ADR1
ACR1
ACR2
ABD
END OF MESSAGE DETECTOR
EMD
MRL
31.25KHz
G111
G211
DATA
CLEAR
RRL
D27
1MHz CLK
ENABLE ANM1
ENABLE ANM2
ENABLE ANM16
ANND
(40+P)
(40)
(4)
(8)

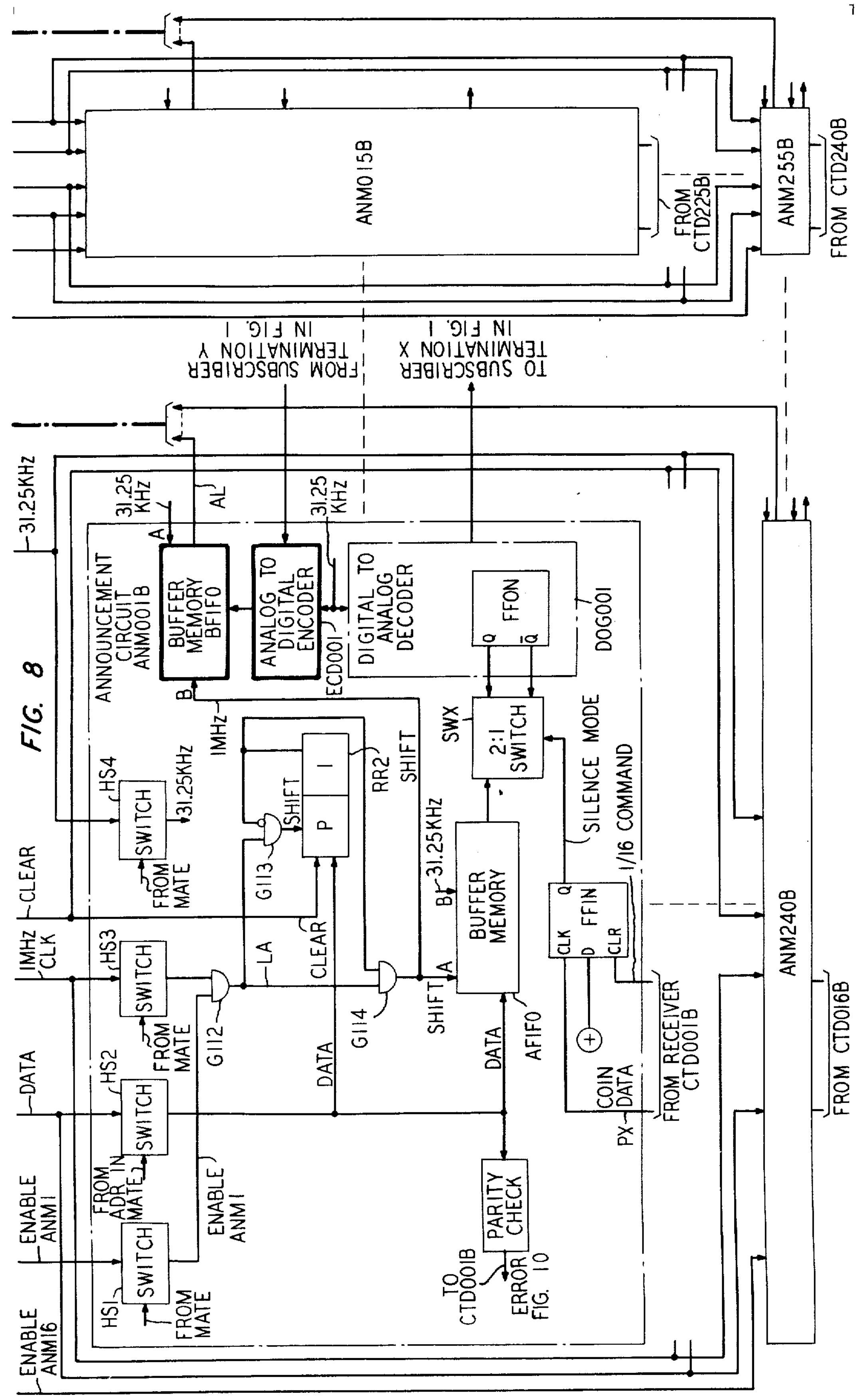
FIG. 8
ANM015B
FROM CTD225B1
ANM255B
FROM CTD240B
FROM SUBSCRIBER TERMINATION Y IN FIG. 1
TO SUBSCRIBER TERMINATION X IN FIG. 1
31.25KHz
CLEAR
1MHz CLK
DATA
ENABLE ANM1
ENABLE ANM16
ANNOUNCEMENT CIRCUIT ANM001B
BUFFER MEMORY BFIFO
ANALOG TO DIGITAL ENCODER
ECD001
DIGITAL TO ANALOG DECODER
FFON
DOG001
AL
SWX
2:1 SWITCH
SILENCE MODE
1/16 COMMAND
HS4
SWITCH
FROM MATE
HS3
HS2
HS1
FROM ADR IN MATE
ENABLE ANM1
G113
G112
G114
LA
RR2
SHIFT
BUFFER MEMORY
AFIFO
FFIN
COIN DATA
PX
FROM RECEIVER CTD001B
PARITY CHECK
TO CTD001B
ERROR FIG. 10
ANM240B
FROM CTD016B

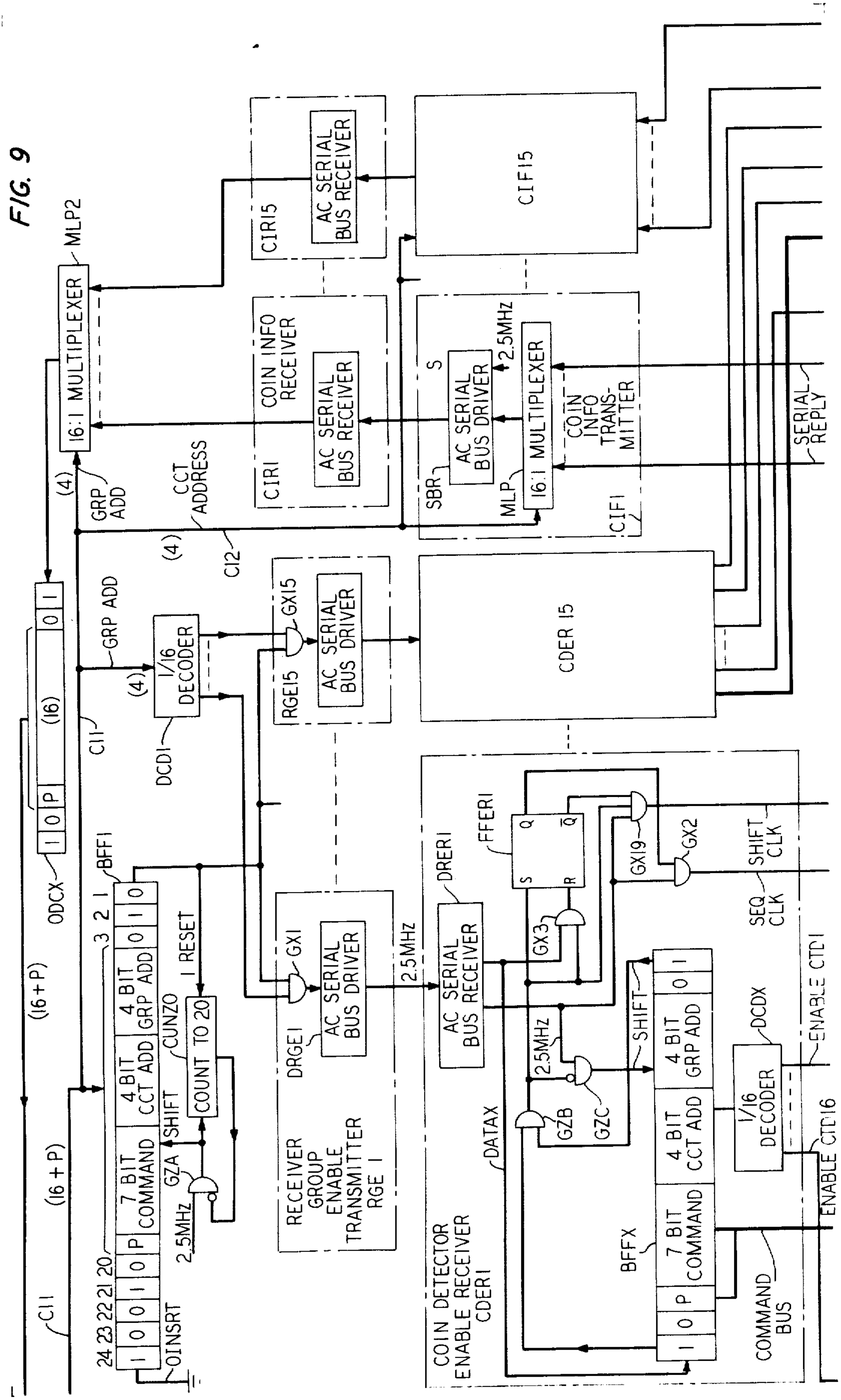

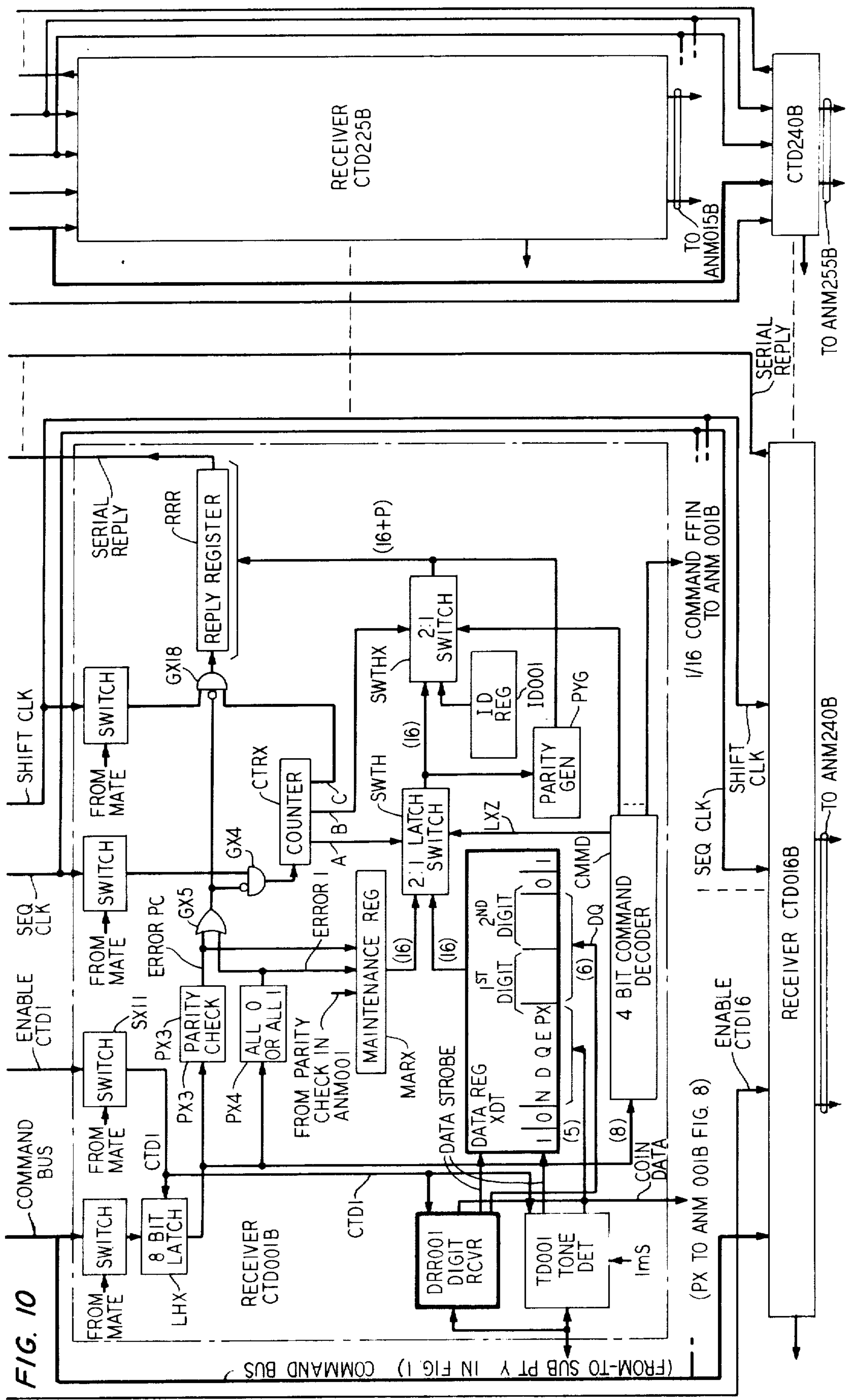
FIG. 10
RECEIVER CTD225B
TO ANM015B
CTD240B
TO ANM255B
SERIAL REPLY
SHIFT CLK
SEQ CLK
ENABLE CTD1
COMMAND BUS
FROM MATE
SWITCH
8 BIT LATCH
LHX
SX11
PX3
PARITY CHECK
PX4
ALL 0 OR ALL 1
ERROR PC
GX5
GX4
GX18
COUNTER
CTRX
REPLY REGISTER
RRR
ERROR 1
MAINTENANCE REG
MARX
FROM PARITY CHECK IN ANM001
2:1 LATCH SWITCH
SWTH
2:1 SWITCH
SWTHX
ID REG
ID001
PARITY GEN
PYG
(16+P)
(16)
LXZ
CMMD
4 BIT COMMAND DECODER
DATA REG XDT
1ST DIGIT
2ND DIGIT
DQ
DATA STROBE
COIN DATA
RECEIVER CTD001B
CTD1
DRR001 DIGIT RCVR
TD001 TONE DET
1mS
(PX TO ANM 001B FIG. 8)
1/16 COMMAND FFIN TO ANM 001B
RECEIVER CTD016B
ENABLE CTD16
TO ANM240B
(FROM-TO SUB PT Y IN FIG. 1) COMMAND BUS

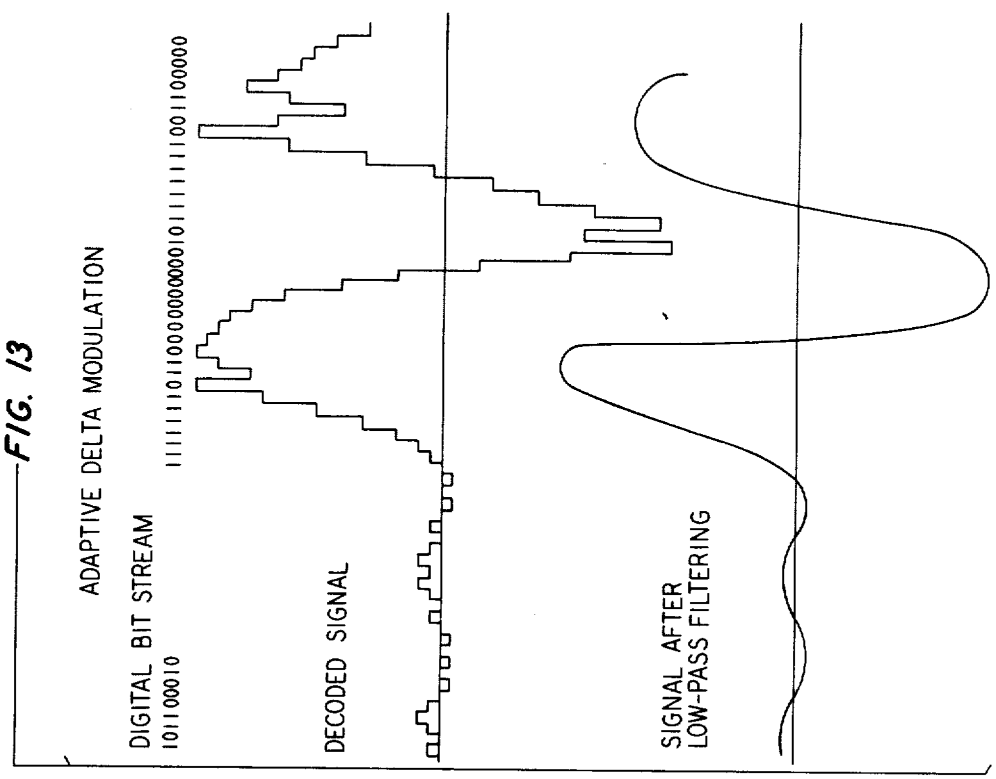

FIG. 13
ADAPTIVE DELTA MODULATION
DIGITAL BIT STREAM
10110001011111110110000000000001011111111001100000
DECODED SIGNAL
SIGNAL AFTER LOW-PASS FILTERING

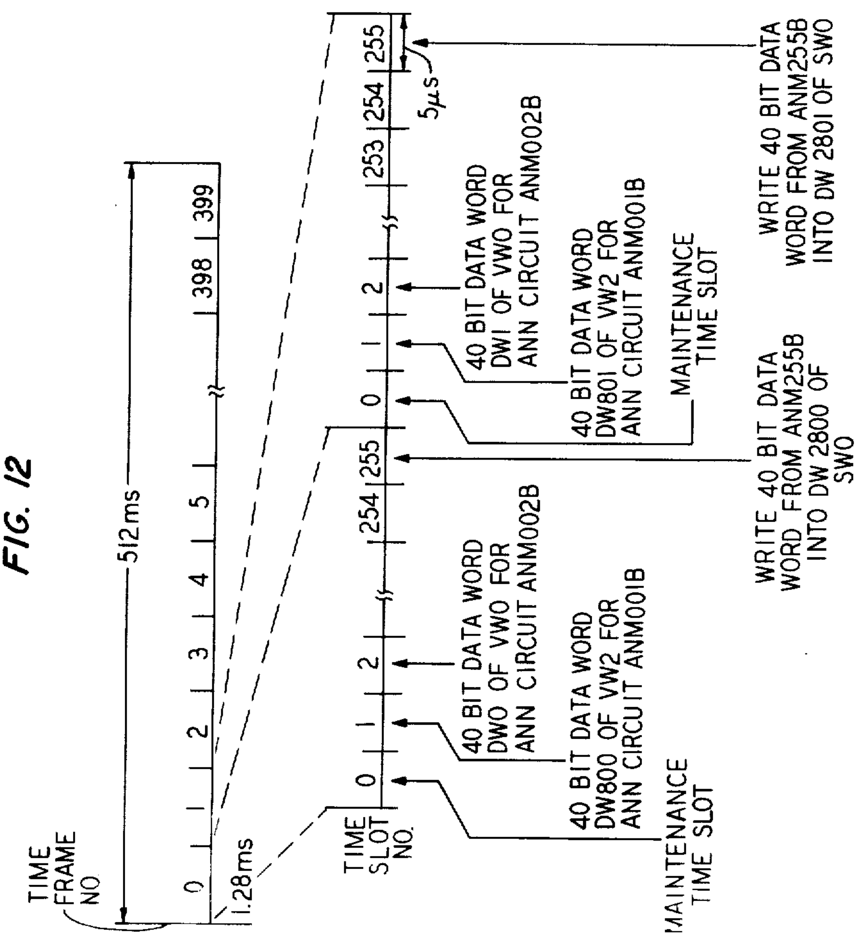

FIG. 12
TIME FRAME NO.
512 ms
0
1
2
3
4
5
398
399
1.28ms
TIME SLOT NO.
0
1
2
254
255
253
5μs
40 BIT DATA WORD DW0 OF VW0 FOR ANN CIRCUIT ANM002B
40 BIT DATA WORD DW800 OF VW2 FOR ANN CIRCUIT ANM001B
MAINTENANCE TIME SLOT
WRITE 40 BIT DATA WORD FROM ANM255B INTO DW 2800 OF SW0
40 BIT DATA WORD DW1 OF VW0 FOR ANN CIRCUIT ANM002B
40 BIT DATA WORD DW801 OF VW2 FOR ANN CIRCUIT ANM001B
WRITE 40 BIT DATA WORD FROM ANM255B INTO DW 2801 OF SW0

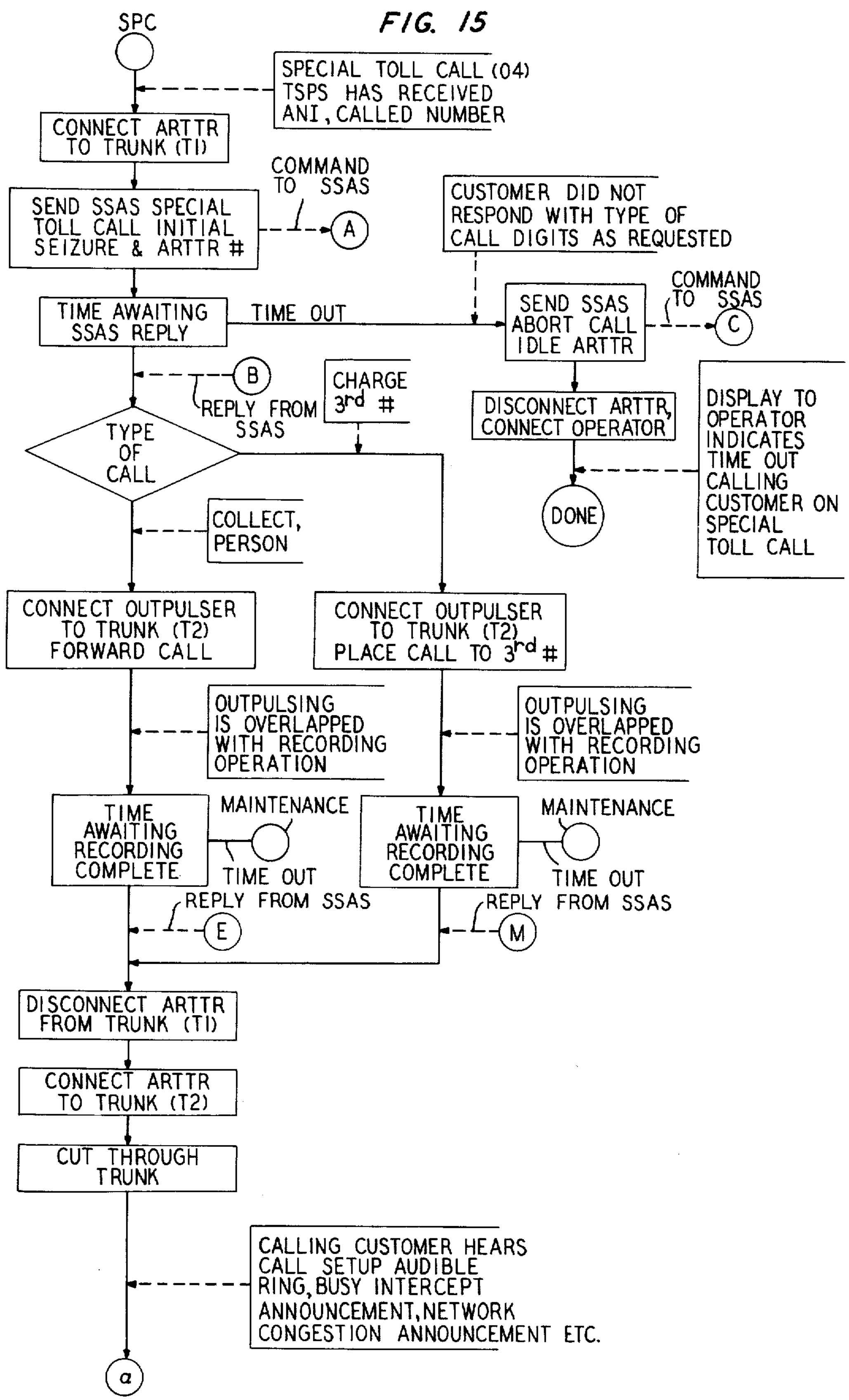
FIG. 15
SPC
SPECIAL TOLL CALL (04) TSPS HAS RECEIVED ANI, CALLED NUMBER
CONNECT ARTTR TO TRUNK (T1)
SEND SSAS SPECIAL TOLL CALL INITIAL SEIZURE & ARTTR #
COMMAND TO SSAS
A
CUSTOMER DID NOT RESPOND WITH TYPE OF CALL DIGITS AS REQUESTED
TIME AWAITING SSAS REPLY
TIME OUT
SEND SSAS ABORT CALL IDLE ARTTR
COMMAND TO SSAS
C
B
REPLY FROM SSAS
CHARGE 3rd #
DISCONNECT ARTTR, CONNECT OPERATOR
DISPLAY TO OPERATOR INDICATES TIME OUT CALLING CUSTOMER ON SPECIAL TOLL CALL
TYPE OF CALL
DONE
COLLECT, PERSON
CONNECT OUTPULSER TO TRUNK (T2) FORWARD CALL
CONNECT OUTPULSER TO TRUNK (T2) PLACE CALL TO 3rd #
OUTPULSING IS OVERLAPPED WITH RECORDING OPERATION
OUTPULSING IS OVERLAPPED WITH RECORDING OPERATION
TIME AWAITING RECORDING COMPLETE
MAINTENANCE
TIME OUT
TIME AWAITING RECORDING COMPLETE
MAINTENANCE
TIME OUT
REPLY FROM SSAS
E
REPLY FROM SSAS
M
DISCONNECT ARTTR FROM TRUNK (T1)
CONNECT ARTTR TO TRUNK (T2)
CUT THROUGH TRUNK
CALLING CUSTOMER HEARS CALL SETUP AUDIBLE RING, BUSY INTERCEPT ANNOUNCEMENT, NETWORK CONGESTION ANNOUNCEMENT ETC.
a

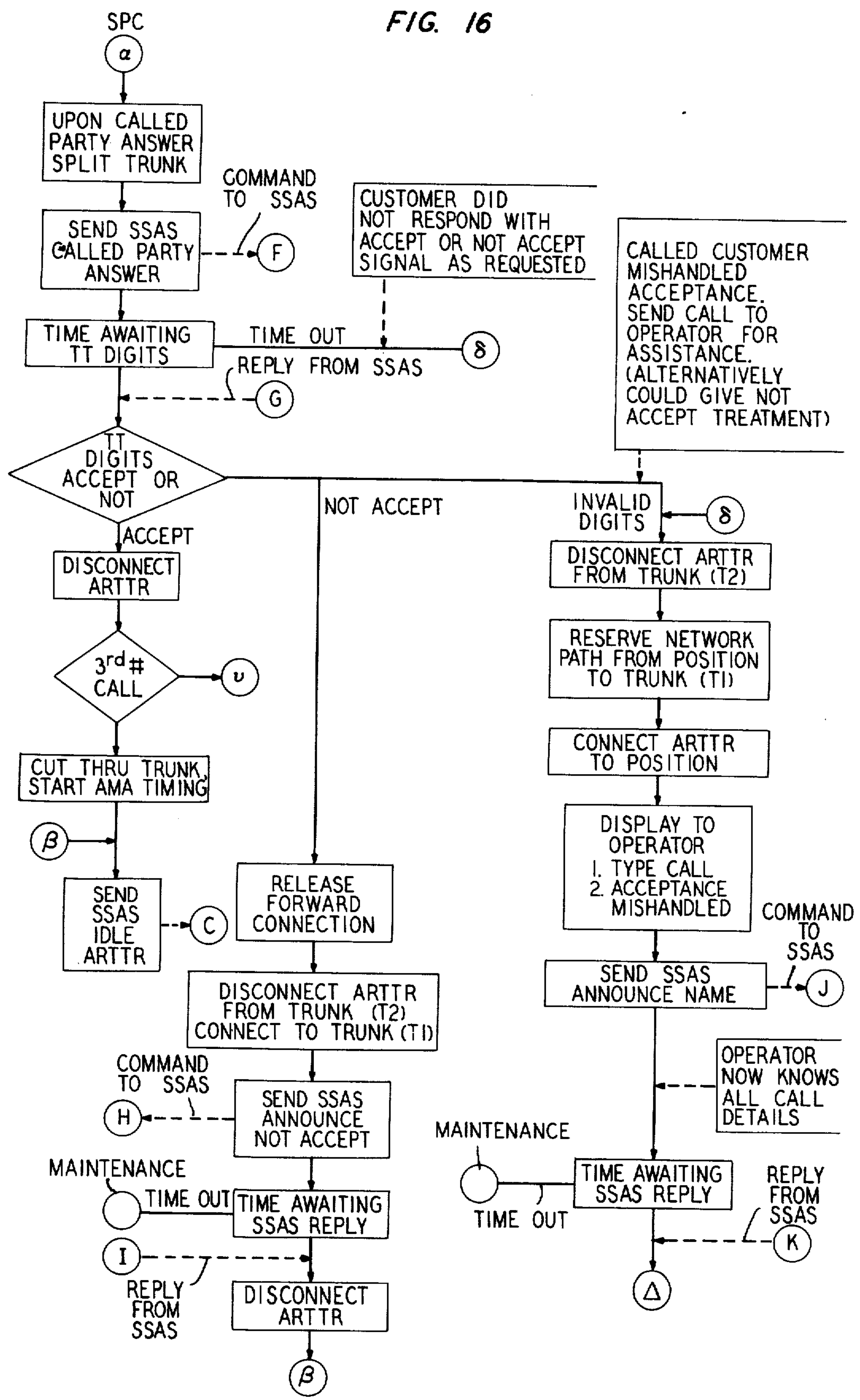

FIG. 16
SPC
α
UPON CALLED PARTY ANSWER SPLIT TRUNK
COMMAND TO SSAS
SEND SSAS CALLED PARTY ANSWER
F
CUSTOMER DID NOT RESPOND WITH ACCEPT OR NOT ACCEPT SIGNAL AS REQUESTED
CALLED CUSTOMER MISHANDLED ACCEPTANCE. SEND CALL TO OPERATOR FOR ASSISTANCE. (ALTERNATIVELY COULD GIVE NOT ACCEPT TREATMENT)
TIME AWAITING TT DIGITS
TIME OUT
δ
REPLY FROM SSAS
G
TT DIGITS ACCEPT OR NOT
NOT ACCEPT
INVALID DIGITS
ACCEPT
DISCONNECT ARTTR
DISCONNECT ARTTR FROM TRUNK (T2)
RESERVE NETWORK PATH FROM POSITION TO TRUNK (T1)
3rd # CALL
υ
CONNECT ARTTR TO POSITION
CUT THRU TRUNK, START AMA TIMING
DISPLAY TO OPERATOR
1. TYPE CALL
2. ACCEPTANCE MISHANDLED
β
SEND SSAS IDLE ARTTR
C
RELEASE FORWARD CONNECTION
COMMAND TO SSAS
SEND SSAS ANNOUNCE NAME
J
DISCONNECT ARTTR FROM TRUNK (T2) CONNECT TO TRUNK (T1)
OPERATOR NOW KNOWS ALL CALL DETAILS
COMMAND TO SSAS
H
SEND SSAS ANNOUNCE NOT ACCEPT
MAINTENANCE
TIME AWAITING SSAS REPLY
TIME OUT
REPLY FROM SSAS
K
MAINTENANCE
TIME OUT
TIME AWAITING SSAS REPLY
I
REPLY FROM SSAS
Δ
DISCONNECT ARTTR
β

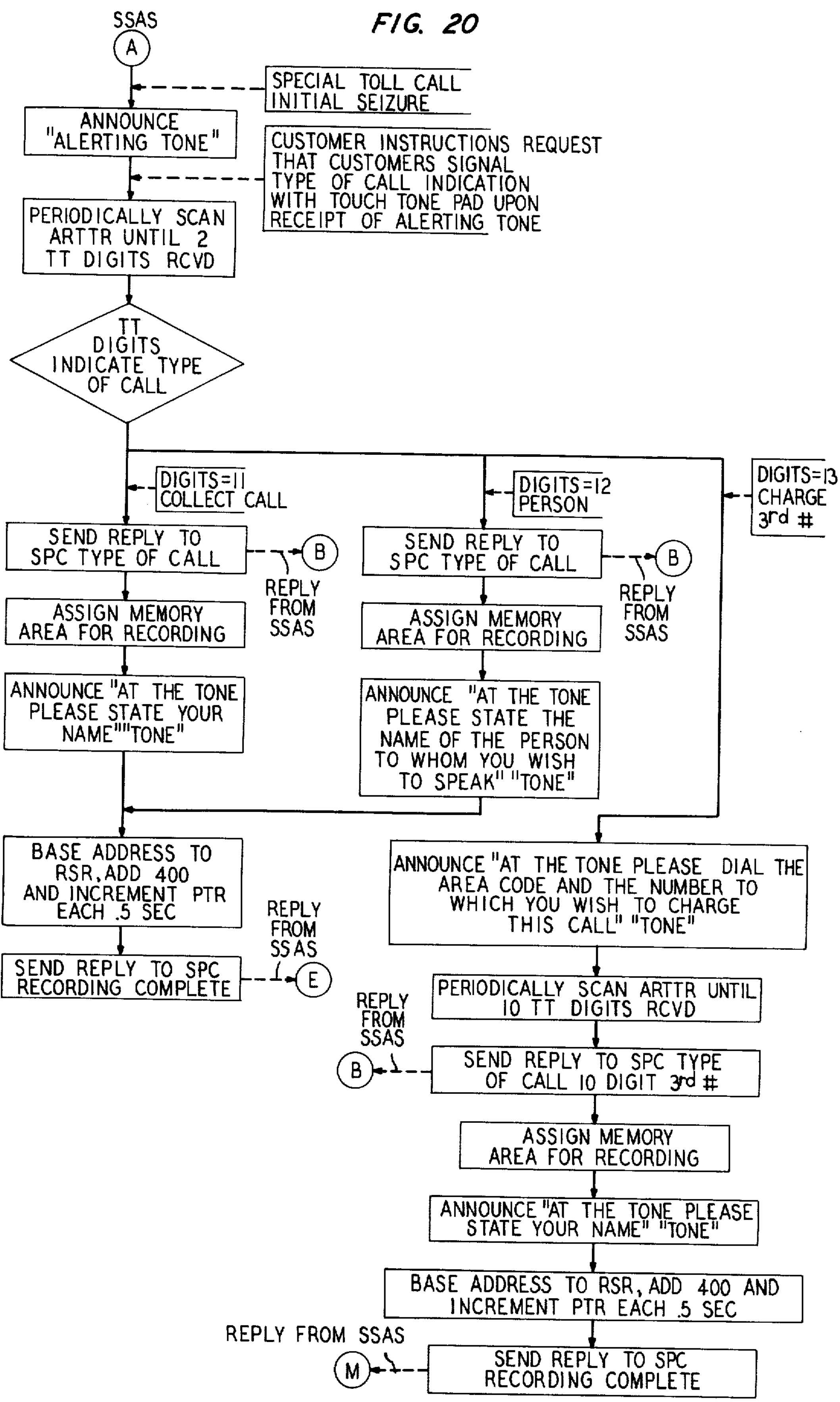
FIG. 20
SSAS
A
SPECIAL TOLL CALL INITIAL SEIZURE
ANNOUNCE "ALERTING TONE"
CUSTOMER INSTRUCTIONS REQUEST THAT CUSTOMERS SIGNAL TYPE OF CALL INDICATION WITH TOUCH TONE PAD UPON RECEIPT OF ALERTING TONE
PERIODICALLY SCAN ARTTR UNTIL 2 TT DIGITS RCVD
TT DIGITS INDICATE TYPE OF CALL
DIGITS=11 COLLECT CALL
DIGITS=12 PERSON
DIGITS=13 CHARGE 3rd #
SEND REPLY TO SPC TYPE OF CALL
REPLY FROM SSAS
B
ASSIGN MEMORY AREA FOR RECORDING
ANNOUNCE "AT THE TONE PLEASE STATE YOUR NAME""TONE"
ANNOUNCE "AT THE TONE PLEASE STATE THE NAME OF THE PERSON TO WHOM YOU WISH TO SPEAK" "TONE"
BASE ADDRESS TO RSR, ADD 400 AND INCREMENT PTR EACH .5 SEC
SEND REPLY TO SPC RECORDING COMPLETE
E
ANNOUNCE "AT THE TONE PLEASE DIAL THE AREA CODE AND THE NUMBER TO WHICH YOU WISH TO CHARGE THIS CALL" "TONE"
PERIODICALLY SCAN ARTTR UNTIL 10 TT DIGITS RCVD
SEND REPLY TO SPC TYPE OF CALL 10 DIGIT 3rd #
ANNOUNCE "AT THE TONE PLEASE STATE YOUR NAME" "TONE"
BASE ADDRESS TO RSR, ADD 400 AND INCREMENT PTR EACH .5 SEC
REPLY FROM SSAS
M

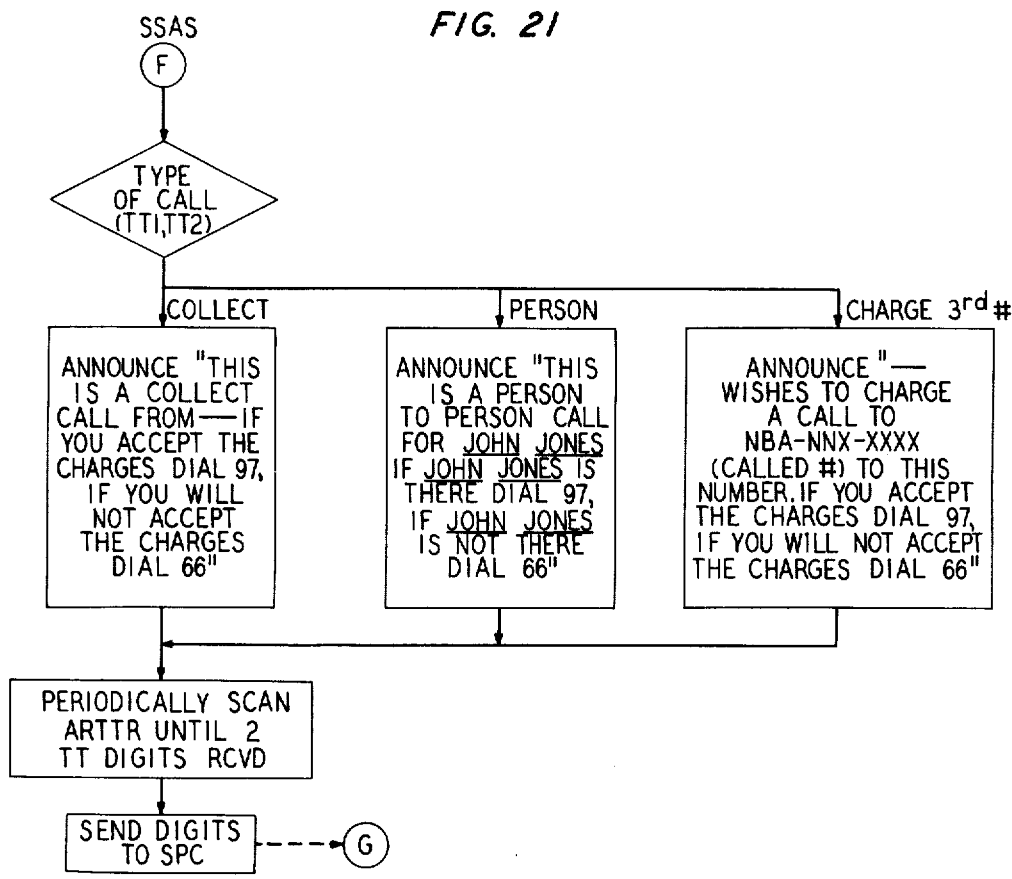
FIG. 21
FIG. 22
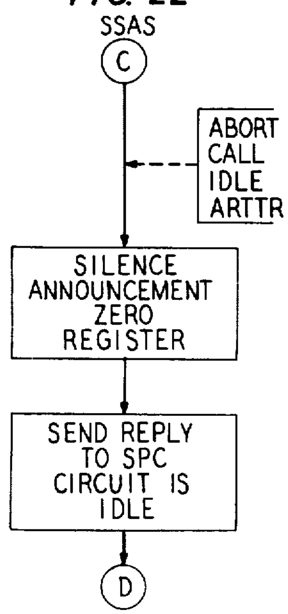
FIG. 23
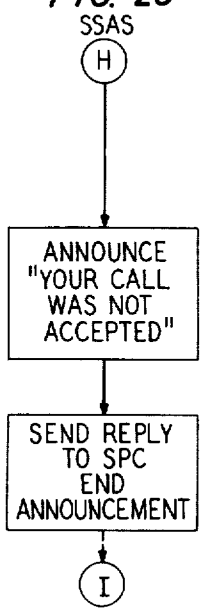
FIG. 24
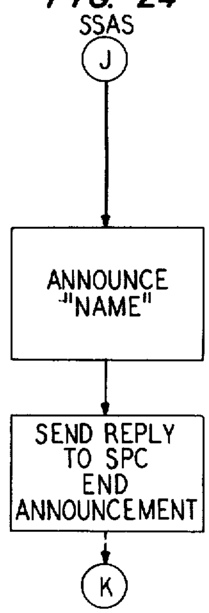

METHOD AND APPARATUS FOR AUTOMATING SPECIAL SERVICE CALL HANDLING

FIELD OF THE INVENTION

This invention relates to telecommunication systems and, more specifically, to systems for serving, on an automated basis, special service calls originating from either coin pay stations or normal telephone stations.

BACKGROUND OF THE INVENTION AND PRIOR ART

When telephone service was first provided on a commercial basis during the latter part of the last century, all telephone calls were completed manually by an operator. An operator responded to a calling signal, learned the identity of the called subscriber, and then utilized a plug and jack connector to interconnect the calling and called stations. Sometime after the invention of the telephone, a trend began toward the automation of telephone switching. First a crank and buttons were added to the subscriber station and then later a dial was added. More recently, direct distance dialing has been instituted which allows a calling subscriber to directly dial most long distance calls in this country and to many foreign countries without operator intervention.

In addition to automating long distance calling, several systems have been proposed for completely automating the handling of calls instituted from coin stations. These arrangements generally include announcement machines for indicating to the calling coin customer the amount of money to be deposited, and also include coin detectors for detecting signals originated at the coin station, which signals represent the deposit of specific coins thereat. One recent automated coin arrangement is described in R. M. Dudonis application Ser. No. 689,600, filed May 24, 1976.

Several arrangements have also been proposed for automating special service calls including person-to-person, collect, credit card, and bill-to-third party. Special service calls are difficult to automate because of the different variations in each call type and the need for substantial interaction between the various parties.

One prior art system for automating special service calls is disclosed in H. R. Wilbourn, Jr., U.S. Pat. No. 3,175,039, issued Mar. 23, 1965. In this system, the calling subscriber dials a prefix code to gain access to an announcer unit which plays back a recorded message giving special instructions for completing the requested call. After the call is automatically completed to the called station, the calling party indicates whether the requested service has been provided and thereby controls the institution of billing for the call. To detect unscrupulous users who may use the initial contact interval to converse with the called station, a recording is made of all conversation or other signals conveyed over the connection prior to the receipt of a "starting billing" signal from the calling subscriber.

Another prior art system disclosed in T. P. Miller et al, U.S. Pat. No. 3,394,229, issued July 23, 1968 improves upon the above-described Wilbourn system in that the voice recording which is made from the institution of the special service call to the start of the billable portion of the call is retained on a permanent basis only if there is a question as to whether the call is billable. Thus, if a start billing indication is not received within a predetermined interval after the institution of a call, then and only then is the initial voice conversation retained.

The above two prior art systems suffer from the disadvantage that the initial recorded portions of the call must be screened to detect fraudulent use of the telephone system. It is believed that such screening is not amenable to automation and thus telephone personnel must manually screen the calls. Moreover, even when a fraudulent call is discovered during the screening, it is still very difficult and expensive to collect the proper billing for the call. For example, on calls from one coin station to another coin station, it is virtually impossible to collect revenue for such calls because the true identities of both the calling and called subscribers are often unknown.

These prior art special service systems suffer from a further disadvantage in that the calling station indicates whether or not another station, normally the called station, will accept charges for the call. Thus, an unscrupulous calling party can force an unwilling called party to be billed for an unwanted call.

It is an object of this invention to fully automate the processing of special service calls.

It is a further object of this invention to provide such automation without requiring the recording of the initial conversation which must be later screened to detect fraudulent use of the telephone system.

It is a still further object of this invention to allow only the party to whom a special service call is to be billed to indicate whether or not the charges for the call are accepted. For a person-to-person call, the calling party indicates, by instituting the call, the acceptance of charges upon answer by the specified party.

SUMMARY OF THE INVENTION

In accordance with the principles of our invention, special service calls such as collect, person-to-person, and charge-to-third number are processed by a wholly automated system utilizing a generic approach which allows the same equipment to be utilized in processing each of these special service call types. To elaborate, at the beginning of a call, the calling subscriber identifies the type of special service call requested by dialing additional digits. The automated system, upon determining the type of service requested, then generates an appropriate announcement for the calling party. For a collect call or for a bill-to-third-number call, the announcement requests the name of the calling subscriber, and for a person-to-person call the announcement requests the name of the person to whom the call is directed. Also for a bill-to-third-number call, the announcement requests the calling party to dial the numbers identifying the third station. The system records and stores the answer(s) received from the calling subscriber and utilizes the answer(s) in formulating another announcement which is conveyed to either the called station or to the third party station depending upon the type of call. For example, for a collect call the system generates a typical announcement for the called station: "This is a collect call from John Jones, if you accept the charges, dial 97. If you will not accept the charges, dial 66." The answer previously received from the calling station (e.g., John Jones) was automatically inserted after the word "from" in the above announcement. For a person-to-person call, the announcement indicates, for example, "This a person-to-person call for ——. If —— is there, dial 97, and if —— is not there, dial 66." For a charge-to-third-number call, an announcement indicates," —— wishes to charge a call to —— (called number) to this number. If you accept the charges, dial 97, if you will not accept the charges, dial 66." In each of the above announcements, the blanks are filled with answers received from the calling station responsive to other announcements directed thereto.

The system is responsive to the digits received from the called station or third party station (i.e., 66 or 97) for either terminating the call or completing the call. Thus, billing for a particular call is only instituted responsive to an indication from the station to which the call is to be billed that the call has been accepted. However, for a person-to-person call, billing is instituted against the calling station upon receipt of an indication from the called station that the requested party is available. Moreover, the calling and called subscriber or third party subscriber cannot freely communicate with each other while the call is being established. This prevents fraudulent use of the automated system prior to the institution of billing.

In accordance with one illustrative embodiment of our invention, the automated coin system disclosed in the above-mentioned Dudonis application is modified to operate in accordance with the principles of our invention. More specifically, an encoder converts speech signals, received from the calling station in response to the questions directed thereto, into a digital form which is then stored in a memory. This stored speech information is later retrieved from the memory and utilized in formulating messages which are applied to the called and third party stations.

In accordance with one feature of our invention, special service calls are processed on a fully automated basis in which information requested of the calling station is utilized in formulating announcements directed to the other stations.

In accordance with another feature of our invention, special service calls are provided on an automated basis in which the party to whom a call is to be charged indicates the acceptance or nonacceptance of the call, except person-to-person calls.

As a still further feature of our invention, such an automated system also includes coin detector means for handling special service calls instituted from calling coin stations.

BRIEF DESCRIPTION OF THE DRAWING

The foregoing as well as other objects, features, and advantages of our invention will be more apparent from a description of the drawing, in which:

FIG. 1 illustrates in block diagram form the manner in which a Special Service Announcement System (SSAS), operable in accordance with the principles of our invention, is added to an existing Traffic Service Position System (TSPS);

FIG. 2 illustrates in greater detail the interface between the stored program controller in TSPS and the microprocessing complex broadly shown as programmable controller PC in FIG. 1; FIGS. 3 and 4 illustrate the manner in which the circuitry in FIG. 2 is duplicated to provide for more reliable operation;

FIGS. 5 through 10, when combined, as shown in FIG. 11, illustrate in greater detail the unduplicated microprocessor system previously generalized in regard to FIG. 2;

More specifically, FIG. 5 illustrates microprocessor MPO, and the manner in which it communicates with its peripheral devices;

FIG. 6 illustrates memory ASTRO which stores binary announcement words and address generator AG which normally controls the addressing of memory ASTRO;

FIG. 7 illustrates the ac transmission of serial announcement words to the announcement circuits and the ac transmission of encoded speech signals from the announcement circuits to memory;

FIG. 8 illustrates the circuitry in the announcement circuits;

FIG. 9 illustrates the manner in which address information is serially conveyed to the coin tone detectors and digit receivers to selectively interrogate these detectors and receivers;

FIG. 10 illustrates the circuitry associated with the coin tone detectors and digit receivers;

FIG. 11 illustrates the manner in which FIGS. 5-10 are to be arranged;

FIG. 12 illustrates how "real-time" is divided into time frames and time slots. Each announcement circuit is serviced during an assigned time slot;

FIG. 13 illustrates how a digital bit stream encoded in an adaptive delta modulated format is first decoded and then filtered to generate audible speech;

FIG. 14 illustrates the manner in which FIGS. 3 and 4 are to be combined;

FIGS. 15 through 19 show in the form of a flow chart, the sequential operations performed by the SPC in FIG. 1 to handle special service calls in this one illustrative embodiment of the invention; and FIGS. 20 through 24 illustrate in the form of a flow chart, the operations performed by the programmable controller PC in FIG. 1 in cooperation with the SPC to handle these special service calls on a fully automated basis.

1.0 GENERAL DESCRIPTION

Figure 3:
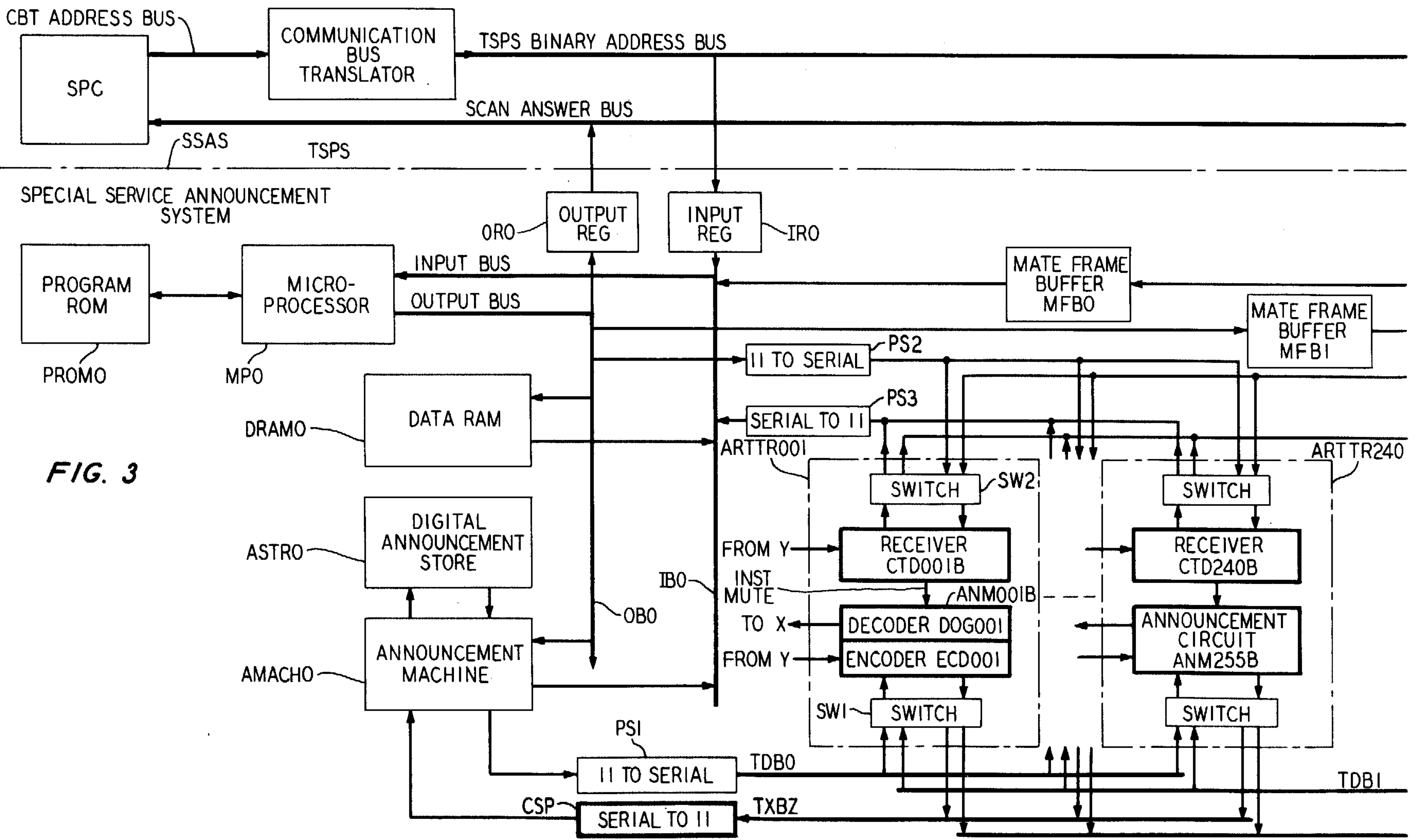

FIG. 1 illustrates in block diagram form the manner in which a Special Servic Announcement System (SSAS) is added to an existing TSPS office to automate special service calls in accordance with the principles of our invention. The TSPS is comprehensively described in R. J. Jaeger, Jr. et al. U.S. Pat. No. 3,484,560, issued Dec. 16, 1966, and also in the Dec. 1970 issue of the *Bell System Technical Journal.*

1.1 Prior Art TSPS System

With the advent of TSPS, many of the functions previously performed by an operator at a cordboard were automated. More specifically, a customer at a coin station CS would make an initial deposit and then dial a 1 followed by 7 or 10 digits. The local office LO routes the call to a TSPS trunk TRK1 and down conductors T1 to the TSPS network NET. Stored program controller SPC, which is a duplicated processing unit for performing arithmetical and logical functions on data in accordance with its stored program, controls network controller NTC to establish connection P1. The local office transmits the calling and called digits to digit receiver DR via conductors T1 in the normal manner. The TSPS rates the call and displays the charge and initial period information to an operator at a position such as position POS. A new network connection (not shown) is then established between conductors T1 and position POS by TSPS network NET. While the operator at position POS informs the calling party of the requisite coin deposit, outpulser OTP is controlled by the SPC to outpulse the digits in the called number via path P4 and conductors T2 to toll office TO. When the calling subscriber deposits coins at station CS, distinctive tones are generated thereat indicating the type of coin deposit, i.e., nickel, dime, quarter. While the customer is depositing the coins, the toll office TO establishes the call to the called station in the normal manner. When the called party answers and the operator has determined that the requisite amount has been deposited, the call, under the control of the operator, is cut through by trunk TRK1 directly from the local office LO to the toll office TO.

The TSPS system is also adapted to handle special service calls (such as person-to person, collect, credit card, charge-to-third number, and time and charges) originated from either coin stations such as CS or regular stations such as CSB. Generally, these calls are processed by an operator at position POS, who requests information from the calling station and then utilizes the received information to request whether or not the called station or third party station accepts the call. For further details of how TSPS processes typical calls see page 2435 et seq. in the December 1970 *Bell System Technical Journal.*

1.2 Prior Art Automated Coin Subsystem

This one illustrative embodiment of the invention is incorporated into a prior art Automated Coin Subsystem (ACS) described in detail in the above-mentioned Dudonis application. More specifically, with regard to the structure generalized in FIG. 1, the Special Service Announcement System (SSAS) adds additional circuitry to the ACS in the above-mentioned Dudonis application. The added or modified structure is shown in heavy underlining to point out how the automated coin subsystem was modified to service special service calls in accordance with the principles of our invention.

To elaborate, in regard to FIG. 1, the added structure includes digit receiver DRR001 and encoder ECD001. Additionally, the program in the programmable controller PC and the program in the SPC have been modified, but the basic structural components thereof have not been altered. The information content stored in announcement store ASTR has been modified. However, again the structure of the store itself has not been modified.

The prior art ACS was operable to automatically perform all operator functions previously described in regard to coin paid station-to-station toll calls in TSPS. In ACS, announcements to the customers are provided by announcement circuits including decoder DOG001 in announcement circuit ANM001B. Coin deposits are automatically detected by coin tone detectors such as TD001 in receiver CTD001B.

The following describes how the prior art ACS handles a typical coin paid toll call. The customer at coin station CS makes an initial deposit and then dials the call in the same manner previously described. Local office LO routes the call to TSPS and outpulses the calling and called digits which are received at the TSPS in digit receiver DR via path P1 from the T1 conductors. The SPC rates the call and instead of selecting an idle operator position, it selects an idle coin circuit CDAM001 (not shown but similar to circuit ARTTR001). The SPC controls controller NTC to establish connection P2 from the T1 conductors to leads CS001. SPC then sends a command including the identity of the chosen coin circuit, the call charge and the initial period to programmable controller PC via cable CB1. Controller PC comprises self-checked, duplicated microprocessors, as hereinafter described. Responsive to this information from the SPC, programmable controller PC accesses the appropriate memory locations in announcement store ASTR and serially applies the digital binary bit information representing digitized speech retrieved from store ASTR to decoder DOG001 via lead AM001. This decoder converts the serial binary information into audible speech. An announcement requesting the appropriate deposit and initial time period (e.g., "Please deposit 60 cents for the first 3 minutes") is applied to the calling subscriber via point X, hybrid HY2, path AP1, hybrid HY1, leads CS001 path P2, conductors T1, and local office LO to station CS.

Responsive to the received announcement, the calling subscriber begins to deposit coins in station CS. Station CS generates dual frequency, in-band tones for each coin deposited and indicates the amount of the deposited coin by generating a sequence of one or more tone pulses; for example, a single dual-frequency pulse is generated for each nickel deposited, while two such pulses are generated for each dime deposited, and five such pulses are generated for each quarter deposited. These tones are received over conductors T1, network connection P2, leads CS001, hybrid HY1, and path AP2 by coin tone detector TD001. This detector comprises means for detecting the joint presence of the two distinct frequencies and for counting the number of pulses thereby indicating the amount of each coin deposit in five-cent increments. Coin tone detector TD001 is periodically scanned by programmable controller PC over lead CD001 to receive coin deposit detection information therefrom. For each coin deposited, programmable controller PC updates its temporary memory for that detector and determines whether the requested deposit has been made and if not, waits for additional coins to be deposited. If the coins deposited are not sufficient, then the programmable controller PC accesses store ASTR and applies another announcement message or a prompt (e.g., "Please deposit 30 cents more") to the calling subscriber via decoder DOG001.

1.3 Special Service Announcement System

As mentioned previously, the automated coin system in the above-mentioned Dudonis application has been modified to beneficially automate the serving of special service calls in accordance with the principles of this invention. These special service calls include collect, person-to-person, charge-to-third number, credit card and time and charges. In accordance with the principles of this invention, a generic approach suitable for complete automation is utilized to service each of these call types.

To place a special service call, a telephone subscriber dials 0 plus the called number (7 or 10 digits). These special service calls can be instituted from either coin stations such as, station CS in FIG. 1 or from regular stations such as, station CSB in FIG. 1. Local office LO recognizes that the call requires special handling and then forwards the call to the TSPS in the usual manner. The called number as well as automatic number identification ANI information identifying the calling station is received by digit receiver DR via path P1 from the T1 leads in the usual manner. The TSPS upon detecting this 0+ call does not establish an operator connection and does not forward the call in the routine manner. Rather the SPC, as hereinafter explained more fully, commands programmable controller PC to provide either a tone or announcement requesting that the subscriber identify the type of service desired. Only a tone is provided where instructions on coin telephone housings or in telephone directories indicate how the customer should proceed. An example of what might be stated in the instruction is as follows: In order to place a special service toll call, proceed as follows: Lift the receiver. Deposit 10 cents (only at coin stations), listen for dial tone and then dial 0 plus the called number. Upon receipt of a second tone after dialing, please indicate the type of call you are instituting by depressing the appropriate two TOUCH-TONE signalling buttons:

11 for collect,
12 for person-to-person,
13 charge to third number,
14 for credit card - station,
15 for credit card, person-to-person,
16 for time and charges.

Digit receiver DRR001 in FIG. 1 is responsive to the TOUCH-TONE frequencies for indicating the dialed digits.

1.31 Collect Call

If the 11 digits from the calling customer station are received indicating a collect call, programmable controller PC accesses store ASTR to retrieve an appropriate announcement (in the form of digital data words indicating delta modulated audio speech) which indicates, for example, "At the tone, please state your name, . . . (tone)." This announcement is applied by symbolic leads AM001 in digital form to decoder DOG001 and the resulting voice announcement is applied to the calling subscriber over the following route: hybrid HY2, path AP1, hybrid HY1, lead CS001, path P2, leads T1 and local office LO. Upon hearing the tone, the subscriber would then state his or her name. The received name is then recorded and stored in announcement store ASTR. More specifically, encoder ECD001 in FIG. 1 is enabled to place in a digital delta modulated format all speech signals received over path AP2 during a six second interval following the tone. This digitized speech is then stored in a sequential series of memory locations in store ASTR for future reference.

During the above recording process, the SPC establishes connection P4 between outpulser OTP and leads T2, and then controls the outpulser to outpulse the called number which was previously received. When the called station such as, station CSC in FIG. 1 goes off-hook, answer supervision is returned to the TSPS in the normal manner. A synthesized announcement is then applied to the called subscriber by decoder DOG001 indicating "this is a collect call from ——." The previously recorded 6 second name information from the calling station is inserted after the word "from" in this announcement. This announcement is applied to the called station over the following path: decoder DOG001, hybrid HY2, path AP1, hybrid HY1, lead CS001, path P5 and leads T2. This called station announcement further indicates "If you accept this call, please depress buttons 97 and if you will not accept this call depress buttons 66." The TOUCH-TONE signals from the called station are received by digit receiver DRR001. If signals 97 are received, controller PC so informs the SPC. The SPC then completes the call directly through trunk TRK1 in a normal manner and starts timing on the call. The billing information for this call is then recorded on AMA equipment (not shown) in TSPS at the conclusion of the call in a normal manner.

If the called subscriber responded with a no (66) or did not respond with either a yes or no (97 or 66) within an appropriate time interval such as five seconds, the connection to the called station would be dropped and an appropriate announcement would be conveyed to the calling station (utilizing decoder DOG001) indicating that the charges were not accepted at the called station. The call would then also be terminated for the calling suscriber.

1.32 Person-to-Person

If the calling subscriber initially indicated that a person-to-person call was desired, then the call is handled in a similar manner. However, different announcements are utilized and different information is requested of the calling subscriber. To elaborate, upon detection of a person-to-person call as indicated by the reception of the digits 12, the following announcement is applied to the calling subscriber, "At the tone, please state the name of the person to whom you wish to speak, . . . (tone)." After the tone, the calling subscriber states his name, e.g., John Smith. The name is then recorded and stored in store ASTR in the same manner as was previously described for collect calls. An outpulser is then seized and the call is outpulsed.

When answer supervision is received, an announcement is applied to the called station indicating "This is a person-to-person call for *John Smith.*" The name is inserted by retrieving from store ASTR the previously received name information from the calling subscriber. This called station announcement continues indicating "If *John Smith* is there, please indicate this by depressing the digits 97; if *John Smith* is not there, please depress the digits 66." These digits are received by digit receiver DRR001. If the digits 97 are detected, then the call is cut through, and timing is instituted. If a "no" answer is received, or if no signals are received from the called station in an appropriate time interval, another announcement is then applied to the called customer over the T1 leads indicating for example "Your call was not accepted" or alternatively "The party that you have called is not available. Would you please try again later."

In servicing person-to-person calls it often takes from a few seconds to a few minutes to get the requested party to come to the telephone. To accommodate this problem, the original announcement to the called subscriber could additionally state "If John Smith will be available shortly, or if there is another number at which he can be reached, or if he can call back later, please depress the digit 0 and wait for an operator to answer." Upon detection of the digit 0, program controller PC informs the SPC that an operator is required. Connection P3 is then established to an operator at a position such as, position POS. The operator can then communicate with both the calling and "called" parties, and handle this call in the normal manner.

1.33 Charge-to-Third-Number Call

A charge-to-third-number call is handled in almost the same manner as a collect call exept, initially, an inquiry connection is established to the third party. During the initial contact with the calling subscriber, this subscriber is requested "At the tone, please dial the area code and number to which you wish to charge this call . . . (tone)." These dial digits are received by digit receiver DRR001 and stored for later use. An "inquiry" connection is then established by outpulser OTB to the third party station via the T2 leads. During this outpulsing an announcement is applied to the calling subscriber over the T1 leads requesting "At the tone, please state your name . . . (tone)." This name is recorded and stored in memory ASTR in the same manner as previously described for collect calls.

When answer supervision is returned over the inquiry connection from the third party station, an announcement is applied to the third party indicating "(name of calling party) wishes to charge a call to XXX—XXX—XXXX (called number) to this number. If you accept the charges, dial 97; if you will not accept the charges, dial 66."

If the third party accepts the charges by dialing 97, the inquiry connection from TSPS to the third station is knocked down and outpulser OTP is again connected to leads T2. Now, the outpulser outpulses the called number which was received at the very beginning of the call. When answer supervision is returned indicating that the called station is off-hook, then normal billing procedures are instituted. The calling party hears the audible ringing, busy signal or intercept announcement and is thereby apprised of the progress of the call.

If in the previous example, the third party did not accept the charges and so indicated by dialing 66 (or hanging up), then an announcement is conveyed to the calling station indicating that "your call was not accepted."

In summary, as described above, a fully automated system processes special service calls without any operator intervention. In contrast to prior art arrangements, the initial conversation between the parties is not recorded and, in addition, the party that is billed for the call (except person-to-person calls) has complete control over whether the call is accepted or rejected. The automated arrangement will also further expedite the handling of special service calls for users familiar with its operation. For example, if the correct digits are keyed in during an announcement, the appropriate processing action can be taken immediately and the announcement will be terminated, as hereinafter described.

2.0 Architectural Overview of Special Service Announcement System

FIG. 2 illustrates in block diagram form the major components in SSAS as well as the specific manner in which SSAS communicates with the SPC. As mentioned previously, all the structure which is emphasized by heavy underlining is added to or constitutes structurally modified equipment in the automated coin system in the above-mentioned Dudonis application.

After the SPC establishes a network connection to one of the special circuits ARTTR-, it has to inform SSAS of the specific action required. To elaborate, the SPC operates in accordance with the flow chart of operations in FIGS. 15 through 19. More specifically, the SPC applies a 20-bit command to the CBT address bus. This command is received by communications bus translator CBT which partially decodes the information and transmits it over an ac bus called the TSPS binary address bus. This bus is 21 bits wide including 20 data bits and a parity bit (P) over the data bits. As illustrated on page 2563 of the December 1970 issue of the *Bell System Technical Journal,* the CBT communicates with numerous peripheral devices over the TSPS binary address bus. SSAS is added to the existing peripherals and is operable in accordance with the flow charts on FIGS. 20–24. Enable information transmitted from the SPC is decoded by a central pulse distributor (not shown) which selects the particular peripheral unit, such as SSAS, which should receive the particular order on the TSPS binary address bus. Thus, the central pulse distributor enables 42 bit input register IRO (actually three smaller registers) to receive the 21 bits of information from the TSPS binary address bus. Since commands to the ACS sometimes require 40 bits plus 2 parity bits, two 21-bit data words are sequentially loaded into input register IRO.

SSAS is controlled by microprocessor MPO. In this one illustrative embodiment of our invention, microprocessor MPO is a 16-bit parallel machine with a 1 $\mu s$ cycle time. The data manipulation units (not shown) in microprocessor MPO are duplicated and numerous self checks are made between the outputs of the data manipulation units to ensure the effective operability of microprocessor MPO. Program memory PROMO is a read only memory which stores 24-bit wide program instructions encoded to implement the SSAS flow chart previously mentioned in regard to FIGS. 20–24. The 24-bit program words include 6 bits or error checking information and 18 bits of actual program instructions. One suitable microprocessor is described in R. W. Sevcik U.S. Pat. No. 3,931,505, issued Jan. 6, 1976. Of course, other suitable 16-bit microprocessors are also commercially available.

Microprocessor MPO communicates with its peripheral devices over distinct input and output buses IBO and OBO respectively. These are each dc buses for transmitting 16 information bits and a parity bit over the information bits. The receiver CTD001B and announcement circuit ANM001B in special circuit ARTTR001, previously described in regard to FIG. 1, are also illustrated in FIG. 2. In addition, special circuit ARTTR240 is also illustrated. Each special circuit includes a receiver and an announcement circuit. The receivers are designated CTD001B through CTD240B. The announcement circuits are designated ANM001B through ANM255B. Although there are 240 announcement circuits, as described hereinafter, the announcement circuits are designated partially corresponding to the time slots in which such circuits are serviced. There are 256 time slots, but not all of these are used to service announcement circuits. Thus the 240th announcement circuit is actually designated ANM255.

Data random access memory DRAMO is utilized to store transient call data pertaining to the special circuits. A block of 16 words in DRAMO is assigned to each special circuit. Each of the DRAMO words is 16 bits wide plus a parity bit. Reading or writing DRAMO is a two-cycle operation; first microprocessor MP applies a 16-bit address plus parity on output bus OBO. During the next cycle, the word stored at the memory location identified by the address is output onto input bus IBO if a read command is specified. For a write command, the data on output bus OBO is input into DRAM and stored therein at the memory location identified by the address.

Announcement machine AMACHO controls the accessing of digital announcement store ASTRO responsive to data received from microprocessor MPO. ASTRO stores each 512 ms phrase (such as "Please" or "one") in 400 consecutively addressed 40-bit data words. Announcements are generated by selectively retrieving in sequence the appropriate 512 ms phrases from store ASTRO.

Moreover, ASTRO is also utilized to store information requested from the calling subscriber such as, his or her name for collect or charge-to-third-party calls, and also the name of the called subscriber for person-to-person calls. After information is requested from the calling subscriber, all signals received from the calling subscriber for the following 6 seconds are stored in memory ASTRO. Thus, 12 512 millisecond phrases are stored for each customer response. As mentioned previously, the stored customer response are subsequently retrieved from memory to form a portion of the announcements applied to called or third parties.

Announcement data is supplied to the announcement circuits ANM- on a time-division basis. With reference to FIG. 12, each 512 ms time period (called a base period) is divided into 400 time frames, each having a duration of 1.28 ms. Each time frame in turn is subdivided into 256 time slots, each having a duration of 5 μm.

Each base period, microprocessor MPO determines for each announcement circuit the announcement memory base address identifying the 512 ms announcement speech segment that the announcement circuit will output during the next 512 ms base period. Thus each base period microprocessor MPO sends via bus OBO a speech segment base address to the announcement machine AMACHO for each announcement circuit. If an announcement circuit must be silenced during the next base period, the announcement machine AMACHO must actually be given the specific digital code for silence. The specifics of the announcement machine and the announcement store will be described in greater detail hereinafter. However, one suitable announcement store ASTRO is a 32K IGFET random access memory as disclosed in F. V. Beck et al, U.S. Pat. No. 3,944,800, issued Mar. 16, 1976. Of course, other types of commercial RAMs are equally suitable.

During each time slot announcement machine AMACHO applies a 40-bit delta modulated encoded digital data word retrieved from announcement store ASTRO during that time slot to the predetermined announcement circuit serviced during that time slot. Parallel-to-serial converter PS1 converts the parallel 40-bit data words into a serial format and applies the serial data bits onto time division bus TDBO. Each announcement circuit ANM001B through ANM255B receives the 40-bits on bus TDBO during its respective time slot. For example, circuit ANM001B receives the serial binary information on time-division bus TDBO during time slot 1 while announcement circuit ANM255B receives such information during time slots 255. Since there are 256 time slots and only 240 announcement circuits, it should be apparent that some of the time slots are not utilized for announcement circuit servicing. Actually, time slots 0, 16, 32, . . . , are used for maintenance purposes and not for serving announcement circuits.

Each announcement circuit includes a digital-to-analog converter (decoder DOG-) which decodes the delta modulated encoded data to produce the speech signal. With reference to FIG. 13, a typical digital bit stream is illustrated. This bit stream is encoded in a well known adaptive delta modulation format and, as decoded, generates the waveform designed "decoded signal". The decoded signal is then filtered to produce an audio signal which represents the particular phrase. In delta modulation, a 1 indicates the signal is increasing and a 0 indicates the signal is decreasing. A sequence of alternate 0*s* and 1*s* will result in no output signal. In adaptive delta modulation the step sizes are exponential rather than linear. This helps track sharply increasing or decreasing signals. More specifically, if a series of consecutive 1*s* or 0*s* is received, the step size is increased. If no such consecutive series is received then the step size exponentially decays towards zero. FIG. 13 exaggerates the rate of change in step size to clarify the concept. For a suitable adaptive delta modulation system see, for example, S. J. Brolin U.S. Pat. Nos. 3,628,148 and 3,899,754 respectively issued on Dec. 14, 1971 and Aug. 12, 1975.

As mentioned previously, 16,000 binary bits are utilized to generate one one half-second phrase. FIG. 13 only indicates a bit stream of approximately 70 binary bits. Thus it should be apparent that the illustrated signal only indicates a very small portion of a word phrase.

The audio outputs from the announcement circuits, such as that illustrated in the bottom of FIG. 13, are applied to the calling subscriber, as previously explained in regard to FIG. 1. Thus the audio output of circuit ANM001B is applied to point X in FIG. 1 and then transmitted through the hybrids via path AP1 to the calling subscriber via leads CS001, path P2 and the T1 conductors. Announcement circuit ANM255B in FIG. 2 is connected to a calling subscriber through leads CS240 in FIG. 1 which are connected to special circuit ARTTR240. Of course, the number of special circuits ARTTR- will vary in each system in accordance with the expected or experience load of special service calls.

Each special service circuit ARTTR- also includes an encoder such as ECD001 in FIG. 2 which encodes speech signals received from a subscriber into delta modulated signals. For example, encoder ECD001 in FIG. 2 is connected to termination Y in FIG. 1 to receive the audio speech signals received via hybrid HY1 from trunk TRK1. Each of the 240 encoders generates a 40-bit encoded speech signal in its associated time slot. These data words are applied to time division bus TXBZ in the appropriate time slots. Serial-to-parallel converter CSP converts the serially received 40 data bits from the encoders into parallel 40-bit data words which are applied to store ASTRO via announcement machine AMACHO. One 40-bit data word is applied to ASTRO, each time slot serving a special circuit.

As hereinafter described more fully, a register in machine AMACHO indicates to store ASTRO whether information should be written into the memory or whether information should be retrieved from the memory during each time slot. Thus, during each time slot, announcement information is either (1) retrieved from store ASTRO and applied to the decoder DOG- served in that time slot to provide announcement information to a subscriber or (2) during that time slot information received from a subscriber and encoded by an encoder ECD- is stored in store ASTRO. Thus, for example during time slot 1, information is either retrieved from memory ASTRO and applied to decoder DOG001 or stored in memory ASTRO as encoded by encoder ECD001.

Receivers CTD001B through CTD240B each include well known dual frequency receivers from detecting 1700 and 2200 Hz tones indicative of coin deposits. As soon as a start of a coin tone is detected, the tone detector applies a signal on lead INST MUTE to silence the associated announcement circuit. This aspect will be described in greater detail hereinafter.

Microprocessor MPO scans each of the receivers at least five times every base period to receive information pertaining to any coins deposited since the last scan or any dial digits. This is accomplished by supplying address information on output bus OBO to parallel-to-serial converter PS2. This address information is decoded and selectively enables one of the receivers to apply coin deposit and/or dial digit information to serial-to-parallel converter PS3. The parallel coin deposit and digit information output by converter PS3 is applied to input bus IBO, and microprocessor MPO accesses such information to update the coin deposit and dial digit portion in memory DRAMO corresponding to the addressed receiver (i.e., addressed special circuit ARTTR-).

Each of the receivers CTD- include a digit receiver DRR- in addition to a coin tone detector TD- (see FIG. 1). These digit receivers are utilized to detect TOUCH-TONE signaling frequencies which indicate the particular keys which were depressed by a subscriber. As mentioned previously, these receivers detect the depression of keys such as 97 or 66 which indicate, for example, the acceptance or nonacceptance of a particular call. The digit receivers also detect the digits identifying the third party station. Microprocessor MPO scans these receivers at the same frequency as the coin tone detectors. Moreover, as hereinafter explained more fully, the information detected by the coin tone detectors or the digit receivers is interrogated by the microprocessor at the same time for associated detectors and receivers.

ACS communicates with the SPC utilizing output register ORO and the scan answer bus SCAB. More specifically, microprocessor MPO loads output register ORO in 16-bit segments plus parity. This register is actually a first-in first-out memory with sufficient storage capacity for 64 words. Approximately every 5 to 100 ms, the SPC scans output register ORO and retrieves one of the 17-bit words stored therein.

For further information pertaining to the types of commands conveyed between the SPC and SSAS, and the format thereof, the above-mentioned Dudonis application can be consulted at page 26 et seq. Additional commands are conveyed between the SPC and SSAS as shown on FIGS. 15 to 24 herein.

2.1 Architectural Duplication in SSAS

Figures 3, 4, 14:
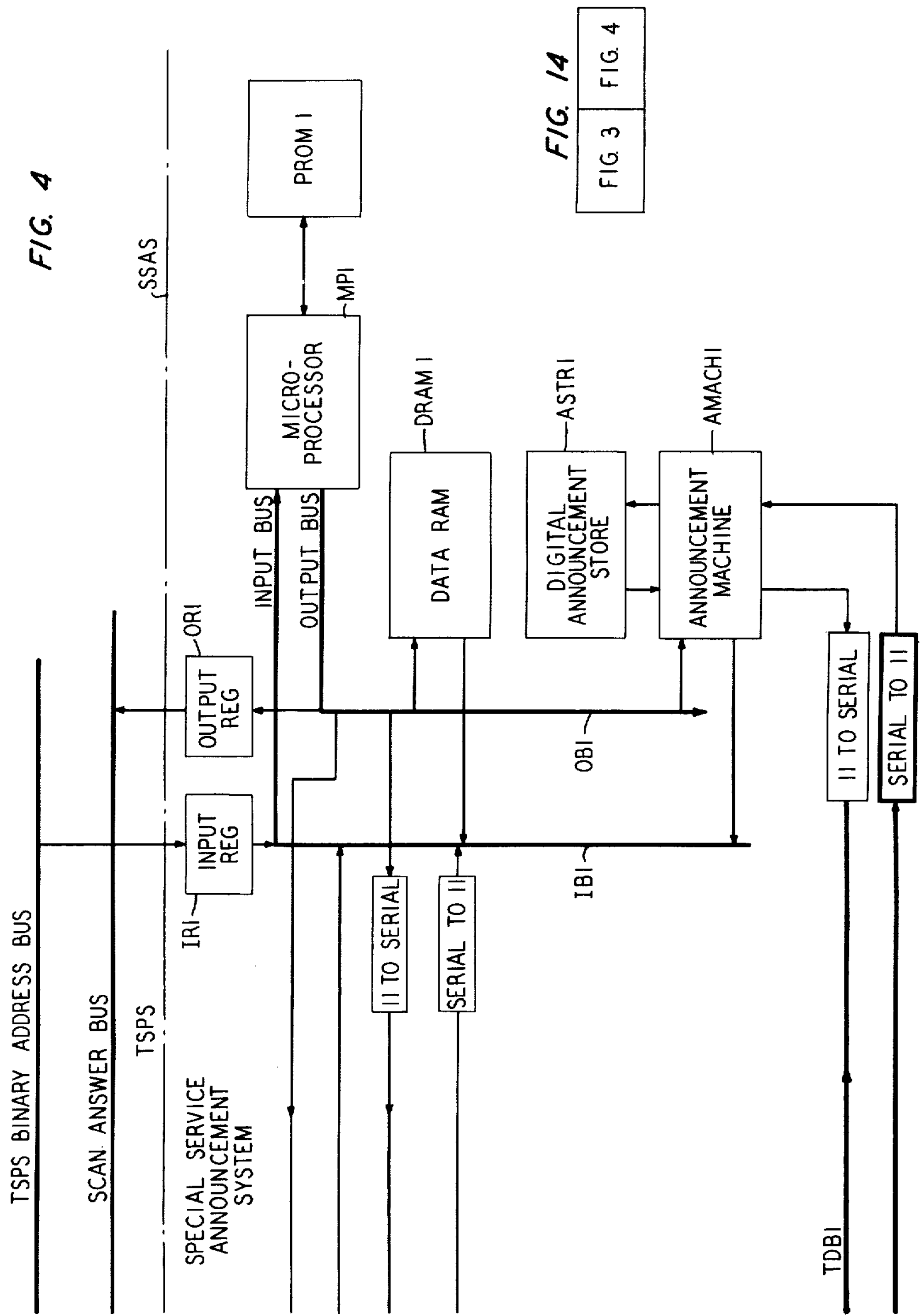
Figure 17:
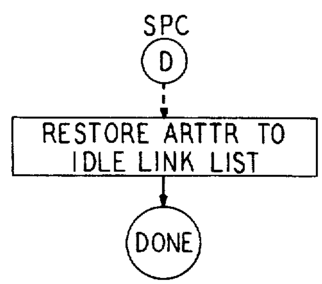
Figure 18:
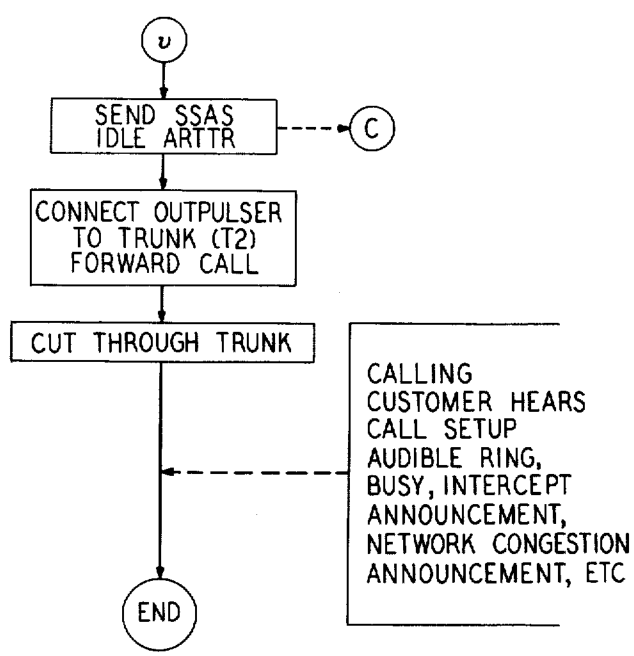
Figure 19:
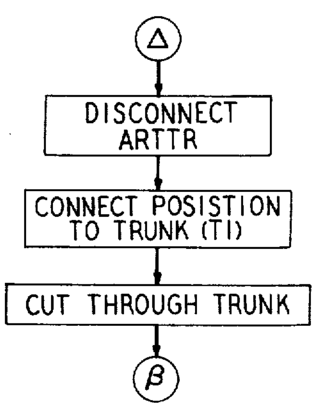

FIGS. 3 and 4 when combined as shown in FIG. 14 illustrate how the circuitry previously described in regard to FIG. 2 is actually duplicated to ensure reliable, fault-free operation. Each microprocessor (i.e., MPO in FIG. 3 and MP1 in FIG. 4) and all their peripheral equipment are duplicated (e.g., data RAM-DRAMO in FIG. 3 and DRAM1 in FIG. 4). However, the receivers and announcement circuits in each special circuit ARTTR- are not duplicated.

Each microprocessor (MPO and MP1) operates asynchronously and no matching is conducted between the microprocessor outputs; rather one microprocessor is placed in an active mode by the SPC and is given control over the special circuits via switches SW1 and SW2 which are operated by the SPC and this active microprocessor actually controls the announcing, and coin and digit detecting. The other microprocessor is placed in a standby mode in which it continues to perform normal data processing but its outputs do not control the announcement circuits or tone detectors.

Each microprocessor processes commands received from the SPC via their respective input registers IRO and IR1, in the manner previously described. They send information to the SPC via output registers ORO and OR1, respectively.

Mate frame buffers MFBO and MFB1 in FIG. 3 are provided to pass information from the output bus of one microprocessor to the input bus of the other microprocessor. Each buffer is a first-in first-out memory storing 256 words, each of which is 16 bits wide plus a parity bit. The primary purpose of the mate frame buffer is to keep the data RAM memory DRAM- in the standby microprocessor updated each time the active DRAM receives data from the active microprocessor. To achieve this, whenever the active microprocessor (assume MPO is active) writes data into its data RAM (DRAMO), the address of the data and the data itself are written into mate frame buffer MFB1 as well. The standby microprocessor MP1 unloads the address and data from mate frame buffer MFB1 and writes the data in its own data RAM DRAM1 at the designated address. The blocks of data in the data RAMs DRAMO and DRAM1 are similarly assigned, so each coin circuit is identified by the same group of addresses in each of the data RAMs.

To simplify the detailed description of the illustrative embodiment of our invention to the maximum extent possible, all further discussion concerning the microprocessors will be with reference to the active microprocessor hereinafter assumed to be MPO. However, the standby processor is keeping a copy of all information written into the DRAM.

Two sets of switches are provided in each special circuit to direct information from the active microprocessor to the announcement circuits and receivers. For example, with reference to special circuit ARTTR001 in FIG. 3, switch SW1 is set by the SPC using a central pulse distributor command to gate information from the "active" time-division bus TDBO or TDB1 into announcement circuit ANM001B. Similarly switch SW2 in special circuit ARTTR001 is set to only accept address information from the active microprocessor and only to apply coin deposit and digit information to the active microprocessor.

3.0 Detailed Description of SSAS

FIGS. 5 through 10 when combined as shown in FIG. 11 illustrate the detailed structure in an unduplicated SSAS. More specifically, the following describes in more detail the unduplicated microprocessor structure previously discussed in regard to FIG. 2. Where appropriate, however, the connections to the other microprocessor structure are illustrated.

The heart of SSAS is microprocessor MPO in FIG. 5. The basic program store is program read-only memory PROMO. Memory locations in this memory are identified by a 14-bit address. Twenty-four bit instructions are received by microprocessor MPO, decoded, and then executed to control the operations of SSAS. Microprocessor MPO controls the gating of information to and from its peripheral devices using the D, S and N leads. Peripheral control circuit PCN is responsive to the state of leads D1-D4 and N1-N4 for selectively providing an enable signal on one of the destination leads D'1-D'64. Each of these "destination" leads is connected to a specific register or similar device and serves to gate the information to the associated register from output bus OBO.

The gating of information onto input bus IBO is controlled by "source leads" S'1 through S'48. Peripheral control PCN selectively energizes one of these source leads responsive to the states of leads S1–S3 and N1–N4. To simplify the drawing as much as possible, the particular D' and S' leads associated with the various registers are not shown. However, each time information is gated into a register or gated from a register, it should be understood that such gating is performed under the control of the D' and S' leads associated with that register.

As mentioned previously, microprocessor MPO is a self-checked machine with duplicated data manipulation units. If a severe failure is detected, the state of the all-seems-well-lead ASW is changed. Such failures are described in S. D. Coomer application Ser. No. 626,338, filed Oct. 28, 1975, for example. Microprocessor control circuit MPC, responsive to the state of lead ASW, inhibits the clock of microprocessor MPO if a malfunction is detected, thereby halting MPO and preventing data mutilation. The state of lead ASW is also passed to the SPC via its scanner, so the SPC can determine when an active microprocessor has encountered a failure condition and can act accordingly to switch the active and standby states of microprocessors MP0 and MP1. The SPC also includes a central pulse distributor point for inhibiting the clock in microprocessor MPO over lead CLK INHIB to inhibit its further operation to prevent the mutilation of data therein. Clock CLK in FIG. 5 is responsive to a 10 MHz square wave for generating the various timing signals utilized in ACS. To simplify the drawing, the clock outputs are not connected to each of the circuits which receive such outputs, but the principle clock inputs are shown at individual circuits.

Microprocessor MPO communicates with its peripheral devices over a 17-bit input bus IBO, and 17-bit output bus OBO. These 17 bits include 16 data bits plus a parity bit designated P. The number of bits which are included in particular cables in the various figures are indicated in parentheses and the parity bit P is indicated as such. Thus for example, output bus OBO also includes the designation (16+P).

Transient information pertaining to the special circuits is stored in data random access memory DRAMO in FIG. 5. Two 1 μs processor cycles are required to read or write memory DRAMO. The address of the word is loaded onto an address register (not shown) in DRAMO during the first cycle. A data read or write at the addressed memory location is accomplished on the next processor cycle, with the word to be written input from bus OBO, or the word to be read from memory DRAMO output onto input bus IBO.

Mate frame buffer MFBO, as mentioned previously, is a 64-word, first-in, first-out memory. Microprocessor MP1 (when active) loads data into buffer MFBO and microprocessor MPO (when standby) reads the data from buffer MFBO onto input bus IBO. As mentioned previously, this buffer permits the active microprocessor to write data into the buffer while the standby microprocessor reads data from the buffer. This data is utilized to update the data RAM in the standby microprocessor. While both microprocessor load data into their MFB—, only the standby microprocessor normally reads the active side MFB—.

Error register ERR in FIG. 5 is connected to input bus IBO. Each bit of this register is connected to a particular monitoring point (e.g., parity checks) in the associated ACS half. Microprocessor MPO periodically reads the contents of this register to process any detected errors. Bus maintenance register BMR in FIG. 5 is utilized to send data from the output bus to the input bus for use in fault diagnosis.

Messages from the SPC are received from the communications bus translator on the TSPS binary bus. This is an ac bus with 20 data bits and 1 parity bit. Most messages from the SPC to the SSAS require 40 bits. Therefore, generally two 20-bit words are sequentially loaded into SSAS. With reference to FIG. 5, the first 20-bit word is loaded into input registers IROB and IROC responsive to an enable pulse from the central pulse distributor in TSPS which enables symbolic gate GG1. Earlier herein these registers and IROA were jointly designated IRO. Four bits are loaded in register IROB and 16 bits are loaded into register IROC. When the next 20-bit word is loaded onto the binary address bus, symbolic gate GG2 is enabled by the central pulse distributor and 16 bits of the 20-bit word are loaded into register IROA and the remaining 4 bits are loaded in the register IROB.

Microprocessor MPO periodically unloads information from these input registers to detect any commands received from the SPC. Since microprocessor MPO and the input bus are 16 bits wide plus parity, only one of the input registers IROA–IROC is read during a 1 μs machine cycle.

Information form SSAS is sent to the SPC via the TSPS scan answer bus. Two 20-bit output registers OROA and OROB in FIG. 5 are provided. Register OROA is loaded with 17 bits from the output bus. When data is stored in register OROA, lead FULL is enabled. Responsive to the state of this lead, parity generator PG100 generates a new parity bit on lead P1 over the parity bit output by register DROA, the FULL lead and two maintenance status bits. Twenty bits of data are then gated into register OROB (if it has been emptied by the SPC), namely the FULL indication, the 16 bits of data, the two maintenance status bits, and the parity bit P1 over each of the previous 19 bits. The TSPS scans register OROB at least every 100 ms and, depending upon the state of the bit FULL, determines whether another scan is required to receive a second word, temporarily stored in register OROA.

3.1 The Digital Announcement Store

Digital announcement store ASTRO is depicted in FIG. 6. In this one illustrative embodiment of our invention, the memory contains 32,768 47-bit words. In each 47-bit word, 40 bits are utilized for data storage; 6 bits are used for a Hamming code over the 40 data bits and 14 of the address bits, and a single parity bit is provided over the data, address and Hamming bits. Memory access and refresh controller MARC provides registers to buffer address and data, common logic to recognize processor commands, and circuits to generate common timing signals necessary to access the IGFET memory module. The data in the memory is periodically refreshed automatically by the controller to maintain the viability of the stored information. One suitable memory is described in some detail in the previously-mentioned Beck et al. patent. As the number of vocabulary words increases, additional memory modules can be added.

The memory module is utilized to store a plurality of half second vocabulary phases designated VW0, VW1, VW2 . . . . Each vocabulary word comprises the information in 400 consecutively addressed memory locations. For example, vocabulary word VW0 comprises data words DW0–DW399 respectively stored in absolute memory address locations 0–399. Similarly, vocabulary word WV1 is stored at absolute memory addresses 400 through 799. Each vocabulary word is utilized to produce a speech segment having a duration of 512 ms. At a speech sampling rate of 31.25 kHz, a 512 ms speech segment comprises exactly 16,000 data bits (i.e., 40 bits × 400 words).

Memory ASTRO is also utilized to store the speech segments received from the calling subscriber. Each of these segments has a duration of ½ second and is identified by a designation SW0, SW1 . . . , SW7 . . . . Like each of the vocabulary words, each of the stored speech segments SW- comprises 400 consecutively addressed memory locations, with each location storing a 47-bit word.

As mentioned previously, FIG. 12 illustrates the basic "time" division arrangement utilized to service the various announcement circuits ANM0001B-ANM255B. As mentioned previously, each base period of 512 ms, corresponding to the duration of each vocabulary word, is divided into 400 time frames and each time frame is subdivided into 256 time slots. Time slots 0, 16, 32, . . . , are used only for maintenance purposes, as hereinafter described. Each of the other time slots is permanently assigned to an announcement circuit. For example, time slot 1 is reserved for announcement circuit ANM001B while time slot 2 is reserved for announcement circuit ANM002B. The particular time slot assignments will be hereinafter explained more fully; however, each announcement circuit receives a 40-bit data word in its associated time slot and also generates a 40-bit data word representing encoded speech in its associated time slot. Thus each time frame, each announcement circuit (decoder) receives 40 data bits and, accordingly, each base period of 512 ms, each announcement circuit receives 400 40-bit words. Also each associated time frame, each announcement circuit (encoder) generates a 40-bit data word and each base period, each announcement circuit generates 400 40-bit data words. As described herinafter, logic controls memory ASTRO during each time slot to either store the 40-bit data word received from the announcement circuit or to apply a 40-bit data word retrieved from the memory to the announcement circuit.

FIG. 6 also illustrates announcement machine AMACHO which operates to supply the addresses at which memory ASTRO is successively accessed to apply (or receive) the proper digital data to (from) the announcement circuits. To elaborate, the announcement machine includes address generator AG which utilizes hardware to generate the proper address each time slot. More specifically, each base period microprocessor MPO loads all the base addresses associated with the vocabulary words to be sent to or received from each announcement circuit during the next base period of 512 ms. For example, assuming that vocabulary word VW2 (e.g., "Please") is to be applied to announcement circuit ANM001B while vocabulary word VW0 (e.g., "one") is to be applied to announcement circuit ANM002B, microprocessor MPO loads into recirculating shift register RSROA at the proper time slot locations base address 800 for vocabulary word VW2 and base address 0 for vocabulary word VW0.

Nineteen shift registers designated RSRO-0 through RSRO-18 are provided in recirculating register RSROA. The contents of these registers are concurrently shifted one bit position to the right for each time slot. Initially, the base address for time slot 0 is stored in the rightmost column of 19 bits, while the base address for time slot 1 is stored in the next group of 19 vertical bits, while the base address for time slot 255 is stored in the leftmost vertical column of shift register bits. The 19 bits for each time slot base address actually comprise 16 data bits identifying a base address in memory ASTRO, a parity bit over the data and a marker bit which is stored in a special register RSRO-17 and a read-write bit stored in register RSRO-18. The only purpose of the marker bit is to synchronize the shifting of these registers with the operation of a time slot counter, as hereinafter explained. Register RSRO-18 stores a read/write bit for each time slot, which bit controls memory ASTRO to either read the information at the address or write information into the memory location identified by that address.

While recirculating shift registers RSROA are shifted every 5 μs time slot to indicate the base addresses of the instant time slots, structurally identical, recirculating shift registers RSROB are being loaded by MPO with the next group of base addresses for the next set of 512 ms vocabulary words (i.e., next base period). Every base period, the roles of registers RSROA and RSROB are reversed. Every base period, RSR controller RSRC selectively energizes either gate G102 or G103 to allow microprocessor MPO to enter the base addresses for the next 512 ms period in either registers RSROA or RSROB, respectively. RSR controller RSRC also selectively energizes one of the gates G104 or G105 to allow the base addresses from the "active" recirculating shift registers to be applied to OR gate G1051. The marker bit output from register RSRO-17 is applied to gate G106 where it is compared with an output signal from time slot counter TSC. More specifically, counter TSC counts from 0 to 255 to identify the current 5 μs time slot and then overflows every 1.28 ms (time frame) to increment time frame counter INCR. Shift register RSRO-17 stores all 0*s* except for a 1 in bit position 255. So this 1 in bit position 255 should be gated to gate G106 during time slot 255 at which time, time slot counter TSC should generate a HIGH output to increment counter INCR. The absence of correspondence between these two timing signals (i.e., as indicated by the output of gate (G106) indicates that the shift registers and time slot counter are out of synchronism. Accordingly, announcements are not being sent to the proper announcement circuits.

Incremental counter INCR indicates the time frame number. This counter counts from 0 to 399 responsive to the overflow every 1.28 ms from counter TSC. The data and parity bit information out by gate G1051, as explained previously, is applied to parity check PC10. If a parity error is detected, a particular bit in register ERR in FIG. 5 is set. The 16 data bits indicating the base address during the instant time slot are applied to address adder ADDR which adds the base address to the incremental or frame address output by counter INCR and applies the resultant sum to address selector ASE via leads L30. For example, with reference to FIG. 12, during time frame number 0 and time slot 1, base address 800 corresponding to vocabulary word VW2 is applied to address adder ADDR from the rightmost vertical bit column in registers RSROA, while incremental address 0 is applied thereto from counter INCR. The data at absolute address 800 will be accessed (i.e., base address 800 + incremental address 0 = 800). During time slot 1 of the next time frame 1, the recirculating shift registers RSROA will still indicate base address 800. However, time frame counter INCR now indicates incremental address 1. Accordingly, address 801 will be output from address adder ADDR to memory ASTRO and the data word stored thereat will be applied to announcement circuit ANM001B during time slot 1. Similarly during time slot 1 of time frame number 399, incremental counter INCR will indicate the number 399 which will be added to base address 800. Accordingly, the data word at address 1199 (i.e., 800+399) will be applied to announcement circuit ANM001B. Thus, during time slot 1 of successive time frames 0–399, addresses 800–1199 will be applied to memory ASTRO and data words DW800-DW1199 will be applied to announcement circuit ANM001B to generate the 512 ms phrase "Please".

Similarly, during time slot 2 and time frame number 0, a 0 will be added to base address 0 (the address of vocabulary word 0) and the data word DW0 at address 0 will be applied to announcement circuit ANM002B. Finally, during time slot 2 of time frame number 399, data word DW399 stored at address 399 will be retrieved from memory ASTRO and applied to announcement circuit ANM002B because address adder ADDR will add the frame number 399 to the base address 0 received from register RSROA during time slot 2. Thus during time slot 2 of successive time frames 0–399, addresses 0–399 will be applied to memory ASTRO and data words DW0–DW399 will be applied to circuit ANM002B to generate the phrase "one".

Returning now to FIG. 6, during each time slot the 20-bit address identifying a data word to be applied to an announcement circuit is applied to address selector ASE over leads L30. Address selector ASE normally gates the 20-bit address to controller MARC which accesses the data word stored at the specified address and applies the accessed 47-bit data word to parity check circuit PC11. This circuit checks parity over the 47 bits and also checks the validity of the Hamming code and outputs the 40 data bits plus parity to gate G106. The 40 data bits plus parity are applied through OR gate G107 to the associated announcement circuit in FIG. 8 as hereinafter explained.

As mentioned previously, if an announcement circuit is to be silenced during a time frame, it must still receive serial digital information during its own time slot which causes it to generate no audio output (e.g., 010101 . . .). Silence address decoder SAD is responsive to particular address name codes which indicate that the announcement circuit is to be "silenced" during the instant time slot. When decoder SAD detects one of these "silent" addresses, it generates a HIGH output on lead L31 to disable gate G1061. This inhibits any information output from memory ASTRO from being applied to the announcement circuit, identified by the instant time slot. Responsive to the HIGH signal on lead L31, silence word generator SWG generates a data word including a 40-bit series of alternating 1*s* and 0*s*, which word is gated through gate G107 to the announcement circuit served during the instant time slot. Decoder SAD is also responsive to the read/write bit. When data is to be written in memory ASTRO to store a customer response, then the associated decoder in the announcement circuit must be silenced. Thus, decoder SAR responsive to a write indication also generates an alternating series of ones and zeros.

Customer responses to be stored in memory ASTRO are processed utilizing the same address mechanism described above. For example, with reference to FIG. 12, if information is to be written in memory as encoded by announcement circuit ANM255B, then during time slot 255 of time frame 0 the 40-bit word from ANM255B is written into memory at address DW2800, which is the first addressable location of word group SWO. Then during time slot 255 of time frame 1, the next 40-bit word from ANM255B is written into the next location DW2801. Finally, during time frame 255, a 40-bit word will be written into DW3199. Thus, a half-second customer response is now stored in SWO. The next half-second phrase is stored in a similar manner at another word group SW—which is identified by the base address selected by microprocessor MPO. The 6 seconds of recorded speech is stored in 12 word groups SW—.

As mentioned previously certain of the time slots are not utilized to service announcement circuits. These time slots are spaced every 16 time slots. Time slots 0, 16, 32, etc. are maintenance time slots. These maintenance time slots are identified by a HIGH output on lead MAINTSLOT from counter MCT. This counter counts from 1 to 16 responsive to the 5 μs clock output which delineates the time slots. If microprocessor MPO wishes to access memory ASTRO during one of the maintenance time slots, it loads an address in register PAAR in FIG. 6. The leftmost bit of this address is a 1 which enables gate G108 via lead XX to apply the HIGH output of counter MCT to address selector ASE. Responsive to this HIGH signal, address selector ASE selects the 20-bit address output by register PAAR. The 47-bit data word retrieved from memory ASTRO at the address indicated by register PAAR is then gated into read data register RDRG by the HIGH output of gate G108. Microprocessor MPO gates out information in register RDRG in 17-bit portions. Moreover, announcement address register AAR is also enabled by the HIGH output of gate G108 to store the 20-bit address output from selector ASE. The address information is then gated from register AAR onto the output bus under the control of microprocessor MPO.

When microprocessor MPO desires to write information into memory ASTRO, write data register WDR is loaded with data from output bus OBO. This data is stored at the address location identified by the contents of register PAAR, as previously described, during the next maintenance time slot as identifed by counter MCT.

3.2 Distribution of Announcement Data

During each time slot, the 40 data bits output by memory ASTRO (or the 40 bits output by silence word generator SWG) are applied to the circuitry in FIG. 7 over leads ANND. Also, the 8-bit time slot information in counter TSC is applied to the circuitry in FIG. 7. Announcement data is changed from a parallel to a serial format and commmunicated over an ac bus which applied the serial data to its destination announcement circuit such as ANM001B in FIG. 8. More specifically, the announcement circuits are organized into 15 groups of 16 announcement circuits. The 15 groups are respectively served by announcement data transmitters ADT-1-ADT15. For example, as shown in FIG. 8, announcement circuits ANM001B, ANM017B, ANM033B . . . ANM241B are in the first group and served by ADT1, while announcement circuits ANM015B, ANM031B . .

. ANM255B are in the last group and served by ADT15. As mentioned previously, there are 256 time slots and 240 announcement circuits. Accordingly, some of the time slots are not utilized by announcement circuits. For example, there are no announcement circuits ANM000B, ANM016B, ANM032B, . . . .

The announcement group identification for the instant time slot is performed by 1-out-of-16 decoder D26 in FIG. 7. This decoder is responsive to the least significant 4 bits of time slot counter TSC and generates an enable signal on one of the leads AADB1 through AADB15 to selectively enable one of the announcement data transmitters ADT1 through ADT15 to receive the parallel 40 bits of announcement data from memory ASTRO. Assuming that counter TSC indicates times slot 1, decoder D26 generates an enable signal on lead AADB1. This signal enables gate XX2 to gate the 40-bit data word and parity thereover into announcement data buffer ADB1. The four most significant bits in time slot counter TSC are also gated by gate XX3 into the appropriate bit positions in annoucement data buffer ADB1, which is 48 bits long. Counter CT48 in FIG. 7 normally generates a low output of lead MSL, disabling gate G110. However, when lead AADB1 goes low (i.e., trailing edge) at the end of the 5 μs time slot, counter CT48 resets to a count of zero. Lead MSL then goes high and 1 MHz clock signals are output by gate G110 to over lead SHIFT to buffer ADB1 to serially gate out the 48 bits therein. These bits are applied at a 1 MHz rate to ac serial bus driver ACD1 which transmits the 48 data bits at a 1 MHz rate in serial to ac serial bus receiver ACR1. When counter CT48 counts 48 shift pulses applied over lead SHIFT, it disables gate G110 by forcing lead MSL to go low thereby inhibiting the further transmission of serial data. AC serial transmission of the data bits is utilized rather than dc parallel transmission so that the announcement circuits do not have to be physically associated with the microprocessor complex. This allows the announcement circuits to be associated with the TSPS network and hybrid circuits described previously.

Bus receiver ACR1 derives a 1 MHz clock from the received data in the normal manner and utilizes this clock to enable gate G111 to shift the first six bits of the 48-bit word into register RRL. One-out-of-16 decoder D27 decodes the 4 most significant time slot bits in register RRL to select he particular announcement circuit in the group of 16 announcement circuits which is to receive the serial data. Since we have assumed that counter TSC in FIG. 6 indicated time slot 1, decoder D27 enables lead ANM1 which enables announcement circuit ANMOO1B. Lead ANM1 energizes gate G112 in FIG. 8 to gate the 1 MHz clock signal onto leads LA. These clock signals are applied to gate G113 which applies shift pulses to register RR2. Register RR2 responsive to these shift pulses begins to gate data from lead DATA. After two bits have been received (i.e., a 1 and then P, in that order), the one in the rightmost position generates a HIGH output which disables gate G113 to prevent the further shifting of data into register RR2. Gate G114 is also enabled and now applies the 1 MHz shift pulses to memory AFIFO which, responsive to these 40 shift pulses on leads SHIFT, gates in the 40 data bits serially received from lead DATA. Memory AFIFO is 64 bits long and operates on a first-in, first-out basis. The information is memory AFIFO is gated out at a 31.25 kHz rate through switch SWX to digital-to-analog converter DOG001. This converter, responsive to the 31.25 kHz clock, decodes the adaptive delta modulated serial binary information into an audio signal which is applied to subscriber termination X in FIG. 1.

The clock information which is received by announcement circuit ANM001B is derived from a 250 kHz signal transmsitted by announcement data transmitter ADT1 in FIG. 7. More specifically, this clock signal is transmitted by ac serial bus driver ACD2 to ac serial bus receiver ACR2. Receiver ACR2 derives a 31.25 kHz clock by dividing the 250 Hz signal by 8. This 31.25 kHz signal is applied to announcement circuit ANM001B to control memory AFIFO, converter DOG001, encoder ECD001 and memory RFIFO.

During time slot 2, the 40-bit serial data word output from memory ASTRO is applied to announcement circuit ANM002B, which is not shown in FIG. 8. However, this announcement circuit is the first announcement circuit in the second group of 16 circuits (i.e., ANM002B, ANM018B etc.). Accordingly, decoder D26 in FIG. 7 generates an enable pulse on lead AADB2 to gate the data and time slot information into announcement data transmitter ADT2 (not shown). During time slot 3, the first announcemt circuit in the third group is served, and so on for time slots 4–15. Time slot 16 is not used by an announcement circuit. Time slot 17 is used to service the second announcement circuit in the first group (i.e., ANM017B). For time slot 17, decoder D26 enables lead AADB1 to enable ADT1 and MDR1. Then, decoder D27 enables lead ANM17 to activate ANM017. Time slot 18 is used to service the second announcement circuit in group two (i.e., ANM018) and so on. Thus, in this time slot assignment, each announcement data transmitter receives 40 bits of data every 16 time slots.

During its associated time slot, each announcement circuit in addition to receiving announcement information from memory ASTRO also generates encoded speech information for conveyance to memory ASTRO. More specifically, analog-to-digital encoder ECD001 in FIG. 8 is responsive to speech signals received at termination Y in FIG. 1 for encoding the analog speech signals into digital delta modulted bits. This speech is encoded at a 31.25 kHz rate and is applied to buffer memory RFIFO. Responsive to the previously mentioned pulses which appear on lead SHIFT from gate G114, buffer memory RFIFO serially outputs 40 data bits over lead AL.

Multiplexor MRL in FIG.7 responsive to the 4-bit time slot in register RLL selects the serial information from the announcement circuit identified by the time slot (here ANM001B) and applies the serial 40 bits to ac serial bus driver ABD. This driver further applies the serial 40 bits at a 1 MHz rate to serial bus receiver ACSX. This receiver then further applies the information to recorded data register RDR along with 1 MHz clock signals derived from the received information in the normal manner. These clock signals gate the 40 data bits into register RDR. One-out-of-16 multiplexor MRL2 responsive to 4-bits from time slot counter TSC identifies the selected group of announcement circuits, receives the 40 parallel data bits from register RDR and applies these bits to Hamming and parity circuit HP in FIG. 6. This circuit adds Hamming and parity information to the 40-bit data word in a well-known manner to generate a 47-bit data word which is applied to controller MARC. This 47-bit data word is stored in memory ASTRO at the address indicated by the recirculating shift registers for this time slot only if register RSRO-18 or its counterpart in RSROB contains a write indication.

In summary, each announcement circuit is assigned a distinct time slot in which it receives 40 bits of serial announcement information and generates 40 bits of received speech information. Microprocessor MPO every base period of 512 ms loads the then standby recirculating shift registers RSROA or RSROB with the base addresses identifying the vocabulary words which are being conveyed to the respective announcement circuits during the next base period, or identifying a storage location for encoded speech to be stored during the next base period. Each time frame number, the base address for each announcement circuit is incremented by one so that the next data word in the particular vocabulary word identified by the base address is applied by an announcement circuit served during the instant time slot, or so that the next 40-bit encoded speech word will be stored in the next memory location during the instant time slot. Moreover, during the distinct time slot in which an announcement circuit receives 40 bits of serial announcement information, the announcement circuit also generates 40 bits of information representing speech signals encoded during that time slot. These delta modulated encoded speech signals are applied to memory ASTRO and are stored in the memory or merely ignored depending upon whether a read or write indication is received from registers RSROA or RSROB.

As mentioned previously if a coin detector or digit receiver detects a start of a sequence of coin deposit tones or dial digits during an announcement, the announcement is immediately terminated. It should be apparent that the microprocessor can control the selected of vocabulary words only once every 512 ms. Thus to immediately terminate an announcement, additional hardware is provided in each announcement circuit which forces the application of alternate 1s and 0s to the decoder in that announcement circuit. For example, with reference to FIG. 8, assume that coin detector TD001 detected the start of a coin deposit. The detector applies a HIGH signal to the clock input of flip-flop FFIN via lead PX. This sets the flip-flop, causing the Q output to go HIGH. Responsive to this HIGH signal, switch SWX accepts information from the $\overline{Q}$ output of flip-flop FFON rather than from memory AFIFO. Thus flip-flop FFON inverts whatever signal is input thereto on its $\overline{Q}$ output. Accordingly, a continuous sequence of 1s and 0s is applied to converter DOG so that the converter is effectively silenced.

Each 16 time slots, the information stored in each of the announcement data transmitters ADT-, announcement data receivers ADR- and announcement circuits ANM- must be cleared so that the announcement circuits receive the proper data next time their corresponding time slot arrives. To accomplish this function, end-of-message decoder EMD in FIG. 7 is responsive to the termination of 1 MHz clock signals received from bus driver ACR1 via gate G211. This 1 MHz clock signal terminates after the 48 data bits in buffer ADB1 are transmitted. Responsive to this termination, the decoder generates a HIGH output on leads CLEAR to clear register RRL, decoder D27, and registers RR2 in each of the announcement circuits ANM001B-ANM016B.

As mentioned previously, the announcement circuits are not duplicated. A set of switches is provided in each announcement circuit to accept information from either the announcement data receiver associated with microprocessor MPO or the announcement data receiver associated with microprocessor MP1. For example, with reference to announcement circuit ANM001B in FIG. 8, switches HS1-HS4 are configured by the SPC to only accept information from the active microprocessor MPO (i.e., here announcement data receiver ADR1). When the active-standby designations are changed, these switches are reconfigured to accept information from the "new" active microprocessor.

3.3 Interrogation of Coin Tone Detectors and Digit Receivers

As mentioned previously in regard to FIG. 1, coin tone detectors TD001-TD240 are provided to independently detect coin tones associated with the deposit of coins at a coin station connected thereto via the TSPS network. Digit receivers DRR001-DRR240 detect dial digits in the form of multifrequency tones from calling coin or regular stations. Unlike the announcement circuits discussed previously, the coin tone detectors and associated digit receivers are not interrogated on a time slot basis. Rather the coin tone detectors are individually interrogated under control of microprocessor MPO in FIG. 5. More specifically, each of the coin tone detectors in special circuits being used are interrogated at least twice each half second while the digit receivers in use are interrogated five times each half second. This rate is sufficiently fast to detect each of the groups of coin tones associated with the deposit of several coins and dial digits.

With reference to FIG. 10, the receivers including a digit receiver and coin tone detector are organized in a 16 × 15 matrix. Sixteen coin tone detectors and 16 digit receivers are provided in each of 15 groups. Each group of 16 receivers is served by a receiver group enable transmitter RGE-, coin detector enable receiver CDER-, coin information transmitter CIF- and a coin information receiver CIR-. The enable transmitter RGE- and enable receiver CDER- are adapted to receive address and command information from the input bus IBO and apply this information to a specified receiver CTD-. The coin information transmitter CIF- and coin information receiver CIR- are adapted to return interrogated coin deposit and dial digit information or maintenance information from the specified receiver back to the microprocessor via input bus IBO.

More specifically, to interrogate a specified receiver such as CTD001B, microprocessor MPO loads a 16-bit data word plus parity onto output bus OBO in FIG. 5. This word is conveyed over cable C11 to register BFF1 in FIG. 9. The 16 data bits are organized into a 7-bit command, a 4-bit circuit address, and a 4-bit group address. The 4-bit group address, as mentioned hereinafter, identifies one of the 15 groups of receivers and the 4-bit circuit address identifies one of the 16 receivers in the identified group. The 4-bit group address is also applied via lead C11 to one-out-of-16 decoder DCD1, which generates an output pulse on a selected one of its output leads to enable one of the gates GX1-GX15 depending upon the specified group.

The contents of register BFF1 comprise 24 bits in bit positions designated 1-24 (on top of register). Shift pulses are applied to register BFF1 at a 2.5 MHz rate by gate GZA. The information serially output from register BFFI is applied to each of the gates GX1-GX15, but is output by only the single enabled gate. Here we will assume that receiver CTD001B is being interrogated.

Accordingly, the 4-bit group address will specify group 1 and gate GX1 will be enabled to receive and output the serial word in register BFF1. Each time a 1 is output from register BFF1, counter CUN20 is reset. This counter is not able to count to 20 to disable gage GZA until 20 0s have been output from register BFF1 after the transmission of the 24 data bits. To elaborate, the left-hand input of register BFF1 is tied to ground and a 0 is inserted in the left-hand bit position of this register each time a shift pulse is applied hereto from gate GZA and the contents of register BFF1 are shifted one bit position to the left. Thus, when bit 24, which is a 1, is output from register BFF1, counter CUN20 is reset. Since all 0s follow the 1 in bit position 24, counter CUN20 will not be reset again; therefore, after the twentieth 0 is output, counter CUN20 disables gate GZA and no further information is output to the enabled transmitter RGE1.

AC serial bus driver DRGE1 outputs the serially 24 data bits and 20 0s from register BFF1 to ac serial bus receiver DRER1 over an ac bus at the 2.5 MHz rate. This bus allows the coin tone detectors and digit receivers, and enable receivers, to be physically disassociated from microprocessor MPO.

As serial bus receiver DRER1 receives the ac information and serially applies the binary information over lead DATAX to shift register BFFX, 2.5 MHz clock signals are applied to register BFFX by gate GZC to shift in the data on lead DATAX. When the 21st bit is received, the contents of register BFFX will appear as shown in FIG. 9. (Note, the leading 0 in register BFF1 is shifted out of register BFFX.) The first one and the last one in register BFFX enable gate GZB to generate a HIGH output which disables gate GZC. This prevents the application of any further 2.5 MHz shift pulses to register BFFX.

One-out-of-16 decoder DCDX decodes the 4-bit circuit address and generates a HIGH output on one of the enable leads CTD1–CTD16. Here we will assume that this decoder enables lead CTD1 because the circuit address specifies 1 since receiver CTD001B is being interrogated. The 7-bit command and parity bit are applied from register BFFX to receivers CTD001B–CTD016B via the COMMAND bus. The enable signal on lead CTD1 passes through switch SC11 to set 8-bit latch LHX to receive the 7-bit command and parity bit from register BFFX. Receiver CTD001B includes 4 switches which allow only one of the duplicated microprocessors MPO or MP1 to input information into this receiver. These switches are set by the central pulse distributor (not shown) and are assumed herein to be set so that information from microprocessor MPO is utilized to interrogate the coin tone detector.

Parity check circuit PX3 computes parity over the 7-bit command and compares the computed parity with the received parity bit. If an error is detected, a HIGH indication is generated on output lead ERROPC and a 1 is inserted in a selected bit position of maintenance register MARX. Circuit PX4 also checks the 7-bit command and generates an error output on lead ERR01 if the information contains all 0s or all 1s, which conditions are indicative of an error condition or a diagnostic check. This error indication on lead ERR01 also controls one of the bits in register MARX.

Two-tone detector TD001 comprises well-known logic for detecting dual frequency tones respectively having frequencies of 1700 and 2200 Hz. Detector TD001 also counts the number of approximately 20 ms to 100 ms dual frequency tone pulses to identify the particular coin deposit. One pulse is generated for a nickel, two pulses are generated for a dime, and five pulses are generated at the coin station for a quarter. Upon the initial detection of a coin tone and even prior to counting the number of pulses, detector TD001 generates a HIGH output on lead PX. Bit PX is inserted in data register XDT, and lead PX extends to the corresponding announcement machine ANM001B in FIG. 8. As mentioned previously, a HIGH signal on lead PX causes the announcement circuit to immediately terminate the instant announcement. Lead PX goes HIGH as soon as a coin tone is detected and even before the number of coin tones can be counted. Lead PX also goes HIGH when digit receiver DRR001 detects a dial digit. Since the maximum period between coin tones is about one half-second, and since the maximum number of coin tones is five, detector TD001 takes a maximum of about 3 to 4 seconds to determine the particular type of coin which was deposited. After this determination is made, the detector enters a 1 in either bit positions N, D or Q in register XDT, respectively, to indicate a nickel, dime or quarter. Detector TD001 then generates a signal on lead DATASTROBE to actually gate this information into data register XDT. If a processing malfunction occurs and the detector receives tones associated with the deposit of a second coin prior to the interrogation of data register XDT by microprocessor MPO, detector TD001 also puts a 1 in the E bit in register XDT to indicate a multiple coin problem. When this occurs, microprocessor MPO informs the SPC of this situation and the SPC controls the coin trunk in the associated local office to return any deposited coins. Normally detector TD001 is reset by the enable signal on lead CTD1 prior to the detection of tones indicative of a second deposit. In addition to the above-described coin tone detectors, a digit receiver DRR- is provided in each of the receiver circuits CTD- shown in FIG. 10. For example, digit receiver DRR001 in receiver circuit CTD001B is connected to the subscribers via point Y in FIG. 1. As previously mentioned, this digit receiver is connected to either the calling station, the called station, or an inquiry station to receive the two digits which indicate whether or not the subscriber associated with the station will accept the charges. This digit receiver is also connected to the calling station at the very beginning of the call to receive the two digits which indicate the type of call requested, e.g., collect, bill-to-third party, and person-to-person. This receiver also receives the third party number dialed by the calling subscriber.

Upon detection of a dual frequency tone of the proper dial tone frequencies, digit receiver DRR001 generates a HIGH output on lead PX. As described previously, this serves to immediately silence the associated announcement circuit. Thus, subscribers familiar with the operation of this automated system can key in the correct digits even during the announcements to expedite the processing of their call. Upon detection of a second digit, digit receiver DRR001 generates a high output on its lead DATASTROBE to gate in the 6 bits on cable DQ. The first 3 bits indicate in binary the first digit received and the second 3 bits indicate in binary the second digit received.

The 7-bit command and parity bit stored in latch LHX are also applied to 4-bit command decoder CMMD. Three of the bits in the command are not utilized and only the remaining 4 bits are decoded to generate one-out-of-16 commands. These commands specify whether the information to be sent to the microprocessor will be the contents of maintenance register MARX, or the contents of data register XDT, or the contents of ID register ID001, which contents permanently identify receiver CTD001B.

Normally the microprocessor will specify that information from data register XDT is required. Accordingly, decoder CMMD generates a HIGH output on lead LXZ to enable two-to-one latch switch SWTH to gate therein and temporarily store the word in register XDT. Switch SWTH is also responsive to a clock signal received over lead A as hereinafter explained.

The sequence of gating operations in receiver CTD001B comprises three phases corresponding to the 22nd, 23rd, and 24th bits in register BFFI in FIG. 9 (i.e., 001). To elaborate, when gate GZB in FIG. 9 detected the 21st bit received over the ac bus as discussed previously, then gate GZC was disabled to prevent the further gating of information into register BFFX. Also, flip-flop FFER1 is set by the HIGH output of gate GZB. The Q output of this flip-flop goes HIGH enabling gate GX2 to gate the 2.5 MHz clock signals to the receivers in the first group via lead SEQCLK. Gate GX3 is enabled when the 1 in the 24th bit position in register BFFI is received. This gate generates a HIGH output to reset flip-flop FFER1. Thus this flip-flop is set on the 21st bit and reset on the 24th bit. Thus only three clock pulses are output over lead SEQCLK. These three clock pulses are received by gate GX4 in FIG. 10 and applied to counter CTRX, but only if the gate GX4 was not previously disabled by an error output from gate GX5, as previously mentioned. Responsive to the first clock pulse, corresponding to bit 22, counter CTR generates a HIGH output on lead A to latch switch SWTH, if this switch was previously enabled by detector CMMD over lead LXZ. Parity generator PYG generates parity over the information in switch SWTH and provides a parity bit as its output.

On the second clock pulse applied to counter CTRX corresponding to the 23rd bit, lead B goes HIGH to enable 2:1 switch SWTHX. This switch has been previously configured by an output (or lack of an output) from decoder CMMD to accept inputs from either switch SWTH or ID register ID001 and apply such inputs in parallel to reply register RRR.

The third clock pulse, which corresponds to bit 24, causes counter CTRX to enable lead C which partially enables gate GX18. More specifically as mentioned previously, flip-flop FFER1 in FIG. 9 is reset by the output of gate GX 3 during the 24th bit. Thus after the 24th bit, the $\overline{Q}$ output of the flip-flop goes HIGH, and the output of gate GZB remains HIGH as described previously. Gate GX19 gates the 20 clock pulses (received at 2.5 MHz) corresponding to the twenty 0*s* shifted out of register BFFI before counter CUN20 stopped the shifting. These 20 clock pulses are applied to lead SHIFTCLK by gate GX19. Gate GX18 and corresponding gates in each of the receivers CTD001B through CTD016B further apply the 20 clock pulses to the corresponding reply registers such as RRR. The contents of register RRR are serially applied to lead SERIAL REPLY.

Sixteen-to-one multiplexor MLP in coin information transmitter CIF1 in FIG. 9 responsive to a 4-bit circuit address received over lead C12 (as stored by another register not shown) selects the serial information from the one receiver identified by the address. Here, information from register RRR is selected and applied to ac serial bus driver SBR. This driver transmits the serial information at a 2.5 MHz rate to the bus receiver in coin information receiver CIR1.

Sixteen-to-one multiplexor MLP2 responsive to the 4-bit group address received over lead C11 (as stored by another register not shown) selects one-out-of-15 data channels from receivers CIR1-CIR15. Here multiplexor MLP2 selects CIR1 because circuit 1 is identified and, accordingly, outputs the information originally output from data register XDT in receiver CTD001B. This information is serially applied to output register ODCX.

Microprocessor MPO then interrogates this register to receive the requested information from receiver CTD001B. Approximately 18 cycles or 18 μs are required from the time microprocessor MPO loads the address into register BFFI until the corresponding answer is received in register ODXC. This time is required for the serial transmission at 2.5 MHz of 44 data bits. During this time interval, microprocessor MPO performs other tasks.

If microprocessor MPO had wanted to receive the contents of maintenance register MARX, then the command received by detector CMMD in FIG. 10 would not have configured switch SWTH. The contents of register MARX would have been latched and later output by switch SWTH.

To interrogate ID register ID001 in FIG. 10 for maintenance purposes, the output of decoder CMMD would have configured switch SWTHX to accept information from register ID001. In both of these maintenance situations, the information would be transmitted and received by microprocessor MPO in the manner previously described in regard to interrogating data register XDT.

Summary

As is apparent from the foregoing description, special service announcement system SSAS, as shown in FIG. 1, and as shown in detail in regard to FIGS. 5 through 10, is operable to handle special service calls on a fully automated basis in the sequence shown on FIGS. 20–24. SSAS records subscriber responses to questions directed thereto, and utilizes such responses in generating announcements to other customers. Moreover, in this system the party controlling the institution of billing (e.g., the called party for collect calls, and the third party for bill-to-third party calls) indicates to the automated system whether or not such charges are accepted.

Although the invention and the numerous features thereof have been described in connection with a particular embodiment, it is to be understood that additional applications and embodiments which will be obvious to those skilled in the art are included within the spirit and scope of the invention.

What is claimed is:

1. In an automated special service telephone system for servicing a plurality of types of special service calls and selectively connectable to calling and called subscriber stations, the combination comprising:

receiving means for receiving from a connected calling subscriber station information indicating a type of special service call requested;

generating means comprising means responsive to said received information for generating and applying to said connected calling subscriber station a first voice announcement requesting a voice answer to a specific question corresponding to said type of special service call requested;

storing means for storing said voice answer received from said connected calling subscriber station;

said generating means further comprising means for generating and applying to a connected called subscriber station a second voice announcement including said stored voice answer and requesting a subscriber at said connected called subscriber station to provide information responsive to said second voice announcement indicating whether or not said special service call is to be completed; and said receiving means also arranged for receiving from said called subscriber station information responsive to said second voice announcement.

2. In an automated special service telephone system, the combination according to claim 1, wherein said receiving means comprises a digit receiver;

said storing means comprises a memory for storing announcement words and voice answers in binary bits; and said generating means comprises data processing means for selectively retrieving announcement words and voice answers from said memory and decoding means for converting retrieved announcement words and voice answers into speech signals.

3. In an automated special service telephone system, the combination according to claim 2, wherein said storing means further comprises encoding means for encoding speech signals into binary bits and said data processing means selectively writes said encoded binary bits into said memory.

4. In an automated special service telephone system, the combination according to claim 1 further comprising network means controllable for establishing a connection between said receiving means and said calling subscriber station, and for establishing a connection between said receiving means and said called subscriber station; and data processing means responsive to said generating means for controlling said network means.

5. In an automated special service telephone system for processing a collect call from a calling subscriber station connected thereto and including means for further establishing the connection to a called subscriber station, the combination comprising:

generating means comprising a memory for generating and applying to said calling subscriber station a first voice announcement requesting the name of the calling subscriber;

writing means for writing in said memory a first voice answer received from said calling subscriber station;

said generating means also automatically generating and applying to said called subscriber station a second voice announcement indicating a collect call from the person identified by said first voice answer received from said calling subscriber station and requesting that said called subscriber station indicate whether or not this call is accepted; and receiving means for receiving the indication from said called subscriber station.

6. In an automated special service telephone system, the combination in accordance with claim 5 wherein said memory comprises a plurality of addressable memory locations storing portions of announcement words in binary data words, and wherein said generating means further includes means for selectively retrieving the binary data words stored in said memory and means for converting said retrieved binary data words into voice signals.

7. In an automated special service telephone system, the combination in accordance with claim 5 wherein said writing means comprising means for encoding voice signals into binary data words and access means for loading into said memory the binary data words indicating encoded voice signals.

8. In an automated special service telephone system for processing a person-to-person call from a calling subscriber station connected thereto and including means for further establishing a connection to a called subscriber station, the combination comprising:

generating means comprising a memory for generating and applying to said calling subscriber station a first voice announcement requesting the name of the person to whom the call is directed;

writing means for writing in said memory a first voice answer received from said calling subscriber station;

said generating means also automatically generating and applying to said called subscriber station a second voice announcement indicating that this is a person-to-person call for the person identified by said first voice answer received from said calling subscriber station and requesting that said called subscriber station indicate whether or not the person identified by said first written voice answer is available; and receiving means for receiving the indication from said called subscriber station.

9. In an automated special service telephone system for processing a charge-to-third number call from a calling subscriber station connected thereto and including connecting means for establishing connections to a plurality of other subscriber stations, the combination comprising:

generating means including a memory for generating and applying to said calling subscriber station a first voice announcement requesting a telephone number of a third party;

receiving means for receiving said telephone number of said third party from said calling subscriber station;

said generating means also automatically generating and applying to said calling subscriber station a second voice announcement requesting the name of the calling subscriber;

writing means responsive to said generating means for writing in said memory a voice answer received from said calling subscriber station;

said connecting means establishing a connection to said subscriber station identified by said received telephone number;

said generating means further comprising means for generating and applying to the last-mentioned station a third announcement indicating that the person identified by said voice answer received from said calling subscriber station wishes to charge a call to said received telephone number and requesting that this station indicate whether or not the charges for this call are accepted; and said receiving means also receiving the charge indication.

10. The method of automating special service telephone calls comprising the steps of detecting information from a calling subscriber station indicating a type of special service requested;
applying to said calling subscriber station a first announcement requesting an answer to a specific question;
encoding a voice answer received from said calling subscriber and storing said encoded voice answer in a memory;
retrieving said encoded voice answer from said memory;
decoding said retrieved encoded voice answer;
applying to a called subscriber station a second announcement including said decoded voice answer and requesting that said called subscriber station indicate whether or not the call is to be completed;
detecting an indication from said called subscriber station; and
completing the call from said calling subscriber station to said called subscriber station if said detected indication indicates that the call was accepted, and terminating the call from said calling subscriber station to said called subscriber station if said detected indication indicates that the call was not accepted.

11. The method of automating a collect telephone call comprising the steps of
receiving information from a calling subscriber station indicating that a collect call is requested;
applying to said calling subscriber station a first announcement requesting the name of the calling subscriber;
recording in a memory a voice answer from said calling subscriber station;
establishing a connection to a called subscriber station;
retrieving from said memory said recorded voice answer;
applying to said called subscriber station a second announcement indicating that this is a call from a person identified by said retrieved recorded voice answer received from said calling subscriber station and requesting that said called subscriber indicate whether or not said call is accepted;
detecting said acceptance indication from said called subscriber station; and
completing said call from said calling subscriber station to said called subscriber station if said detected acceptance indication indicates that said call was accepted.

12. The method of automating a person-to-person call comprising the steps of
receiving dialed digits from a calling subscriber station indicating that a person-to-person call is requested;
applying to said calling subscriber station a first announcement requesting the name of the called subscriber;
recording in a memory a response of said calling subscriber station to said first announcement;
retrieving said recorded response from said memory;
applying to a called subscriber station a second announcement including said retrieved response and requesting that certain digits be dialed at said called subscriber station if the person identified by said retrieved response is at said called subscriber station;
detecting digits received from said called subscriber station; and
completing said call from said calling subscriber station to said called subscriber station if certain digits are detected.

13. The method of automating a charge-to-third number call comprising the steps of
receiving digits from a calling subscriber station indicating that a charge-to-third number call is requested;
applying to said calling station a first announcement requesting the name of the calling subscriber;
recording in a memory the response of said calling subscriber station to said first announcement;
applying to said calling subscriber station a second announcement requesting that said calling subscriber station dial a number of a third subscriber station;
receiving said dailed number of said third subscriber station;
establishing a connection to said third subscriber station;
retrieving from said memory said recorded response;
applying to said third subscriber station a third announcement including said recorded response and indicating that the person identified by said recorded response wishes to call said received dialed number and requesting said third subscriber station to indicate whether the charge for said charge-to-third number call is accepted;
detecting an acceptance indication from said third subscriber station; and
completing said call from said calling subscriber station to a called subscriber station responsive to said detection of said acceptance indication.

14. A telephone call switching arrangement for automatically controlling completion of special service telephone call connections between customer telephone circuits wherein the telephone circuits include means controllable by customers to transmit signaling and include means to indicate to customers the meaning of received signaling, the arrangement comprising:
A. means automatically responsive to transmission from a calling customer telephone circuit of special signaling specifying a desired special service call connection to a specified called customer telephone circuit for automatically transmitting to the calling customer telephone circuit a request that the calling customer telephone circuit transmit call-type signaling specifying the particular type of desired call connection,
B. means automatically responsive to transmission from the calling customer telephone circuit of call-type signaling indicating the need for acceptance of the desired call connection by a particular customer other than the calling customer for automatically establishing an inquiry connection to the particular customer telephone circuit,
C. means automatically responsive to transmission from the particular customer telephone circuit of answer signaling indicating an answer of the inquiry connection for automatically transmitting to the particular customer telephone circuit a request that the particular customer telephone circuit transmit acknowledgment signaling specifying whether or not the desired call connection is accepted by the particular customer,
D. and means automatically responsive to transmission from the particular customer telephone circuit of acknowledgment signaling for automatically completing the desired call connection between the calling and specified called customer telephone circuits only if the acknowledgment signaling specifies acceptance.

15. In a traffic service position system including a network establishing a connection from a termination thereon to a calling telephone station, a special service announcement system comprising:

a memory storing a plurality of digital data words each representative of audio signals, data processing means for selectively accessing said memory to retrieve a first group of data words representative of a first audio announcement, decoding means connected to the termination for converting the retrieved first group of data words into the first audio announcement for application to the calling telephone station, and encoding means connected to the termination for converting audio signals received from the calling station into a second group of digital data words, said data processing means including means for writing the second group of digital data words into said memory, said network also establishing a connection from the termination thereon to another telephone station, said data processing means also selectively accessing said memory to retrieve a third group of data words including said second group of data words, and said decoding means also converts the third group of retrieved data words into a second audio announcement for application to the other telephone station.

16. In a telephone system connectable to a calling station and to an other station, generating means including a memory for generating a first announcement and applying the first announcement to the calling station, and means controlled by said generating means for storing in said memory an audio response from the calling station, said generating means also generating a second announcement including the stored audio response and applying the second announcement to the other station, and digit receiving means connected to the other station for detecting digits generated thereat responsive to the second announcement, and wherein said generating means responsive to said detected digits operates to control the completion of a connection between the calling station and the other station.

17. A special service announcement system comprising:

means responsive to first unique signals received from a calling subscriber station for requesting and receiving identifiable information from said calling subscriber station;

means for storing said identifiable information;

means responsive to said first unique signals for utilizing said identifiable information in said storage means for requesting a response from a called subscriber station; and means responsive to second unique signals from said calling subscriber station for terminating or completing a call between said calling subscriber station and said called subscriber station.

18. A special service announcement system in accordance with claim 17 wherein said identifiable information is a speech response and said means for storing includes a memory and means for encoding said speech response and storing said encoded speech response in said memory.

19. A special service announcement system in accordance with claim 17 further comprising digit receiver means for receiving said first and second unique signals.

* * * * *